(12) United States Patent
Usami

(10) Patent No.: US 9,413,261 B2
(45) Date of Patent: Aug. 9, 2016

(54) POWER CONVERSION APPARATUS

(71) Applicant: Toshiba Tec Kabushiki Kaisha, Tokyo (JP)

(72) Inventor: Yutaka Usami, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 241 days.

(21) Appl. No.: 13/895,976

(22) Filed: May 16, 2013

(65) Prior Publication Data

US 2013/0308358 A1    Nov. 21, 2013

(30) Foreign Application Priority Data

May 16, 2012    (JP) .................................. 2012-112266

(51) Int. Cl.
  *H02M 7/04*    (2006.01)
  *H02M 7/217*    (2006.01)

(52) U.S. Cl.
  CPC ................ *H02M 7/04* (2013.01); *H02M 7/217* (2013.01)

(58) Field of Classification Search
  CPC ... H02M 1/12; H02M 1/4255; H02M 1/4208; H02M 1/4233; H02M 1/32; H02M 3/3382; H02M 3/156; H02M 3/00; H02M 3/33507; H02M 33/33523; H02M 33/33592; H02M 33/157; H02M 33/1584; H02M 7/40; H02M 7/066; H02M 7/06; H02M 7/493; H02M 7/53871; H02M 7/7575; H02M 7/525; H02M 7/219; H02M 7/12; H02M 7/217; H02M 7/1555; H02M 7/068; H02M 7/10; G05F 1/52; G05F 1/38; G05F 1/33; G05F 1/335; G05F 1/32; G05F 1/34

USPC ............ 363/74–82, 84, 89, 125–127; 307/66; 315/307

See application file for complete search history.

(56) References Cited

U.S. PATENT DOCUMENTS

| | | | | |
|---|---|---|---|---|
| 4,277,692 A | * | 7/1981 | Small .............................. | 307/66 |
| 4,605,999 A | * | 8/1986 | Bowman et al. ................ | 363/19 |
| 5,426,350 A | * | 6/1995 | Lai ................................. | 315/244 |
| 5,978,243 A | * | 11/1999 | Ishii et al. ....................... | 363/89 |
| 2007/0052397 A1 | * | 3/2007 | Thompson et al. ............ | 323/223 |

(Continued)

FOREIGN PATENT DOCUMENTS

| | | |
|---|---|---|
| JP | 2007-110869 | 4/2007 |
| JP | 2008-295248 | 12/2008 |
| JP | 2012-222852 | 11/2012 |

OTHER PUBLICATIONS

U.S. Appl. No. 13/595,038, filed Aug. 27, 2012, Yutaka Usami, 42 pages.
U.S. Appl. No. 13/181,393, filed Jul. 12, 2011, Yutaka Usami, 72 pages.

(Continued)

*Primary Examiner* — Gary L Laxton
*Assistant Examiner* — Kevin H Sprenger
(74) *Attorney, Agent, or Firm* — Patterson & Sheridan, LLP

(57) ABSTRACT

According to one embodiment, a controller determines the polarity of the input voltage detected by an input voltage detector. Then, when the polarity of the input voltage is positive, the first switch is subject to pulse driving, and when the polarity of the input voltage is negative, the second switch is subject to pulse driving, where the pulse driving is carried out at an on/off timing determined on the basis of the respective detection outputs of an input voltage detector, an input current detector, an output voltage detector, and an output current detector.

7 Claims, 22 Drawing Sheets

(56) References Cited

U.S. PATENT DOCUMENTS

| | | | |
|---|---|---|---|
| 2008/0201103 A1* | 8/2008 | Yang et al. | 702/179 |
| 2011/0032731 A1* | 2/2011 | Coleman et al. | 363/21.12 |
| 2012/0257429 A1* | 10/2012 | Dong et al. | 363/127 |
| 2012/0281435 A1* | 11/2012 | Schlenk et al. | 363/21.02 |
| 2013/0016539 A1 | 1/2013 | Nishibori et al. | |
| 2013/0272044 A1* | 10/2013 | Boys et al. | 363/126 |

OTHER PUBLICATIONS

U.S. Appl. No. 13/219,312, filed Aug. 26, 2011, Yutaka Usami, 75 pages.
U.S. Appl. No. 13/208,177, filed Aug. 11, 2011, Yutaka Usami, 78 pages.
U.S. Appl. No. 13/219,285, filed Aug. 26, 2011, Yutaka Usami, 44 pages.

* cited by examiner

US 9,413,261 B2

POWER CONVERSION APPARATUS

CROSS-REFERENCE TO RELATED APPLICATION

This application is based upon and claims the benefit of priority from Japanese Patent Application No. 2012-112266, filed May 16, 2012, the entire contents of which are incorporated herein by reference.

FIELD

Embodiments described herein relate to a power conversion apparatus that converts an AC voltage obtained from an AC power supply to a DC voltage, and may feed it to a load.

BACKGROUND

In the art, there are usually two methods for converting an AC voltage to a DC voltage.

According to the first method, a diode bridge circuit and a smoothing capacitor are used. Here, the diode bridge circuit carries out full-wave rectification of the AC power from an AC power supply. The smoothing capacitor smoothes the DC power output after the full-wave rectification.

According to the first method, in any state of the AC voltage, either positive or negative, a current always flows in a series circuit including two diodes. In this case, in the two diodes, a power loss is incurred corresponding to the product of the current flowing in each of the diodes and the forward voltage on each of the diodes.

According to the second method, a power factor improving converter (PFC) lies between the diode bridge circuit and the smoothing capacitor used in the first configuration. Here, the power factor improving converter boosts the DC voltage obtained by the full-wave rectification with the diode bridge circuit.

In the second method, during the full-wave rectification, since current flows in the serial circuit including two diodes, a power loss takes place. In addition, as a current alternately flows in a field effect transistor (FET) and a diode that constitute the power factor improving converter, a further power loss takes place.

In addition, for the power factor improving converter, since the waveform of the input current has to be a sinusoidal wave, the output voltage has to be set higher than the input voltage. However, the voltage needed by the load may not necessarily be a voltage higher than the input voltage. In such a case, a voltage-decreasing converter is connected to a subsequent stage of the power factor improving converter, so that the voltage boosted by the power factor improving converter is decreased to a desired voltage. However, a power or energy loss also occurs in this voltage decreasing operation. The overall power conversion apparatus is constituted by three sections, namely, an AC-DC conversion section, a DC-DC conversion (voltage boosting) section, and a DC-DC conversion (voltage decreasing) section. The power loss is the product of the loss of each. For example, when the efficiency of each section is 0.95, the total efficiency for the three sections becomes 0.95×0.95×0.95=0.86. That is, even when each section has a conversion efficiency as high as 95%, the 3-section configuration has an overall efficiency of only 86%. In this way, although each individual section may have a high conversion efficiency, the overall conversion efficiency of a multi-stage configuration becomes much lower.

There is a high demand for the development of a scheme that can conserve energy for electronic equipment. As a part of this scheme, higher conversion efficiency has been pursued for the power conversion apparatus that supplies power to the load. However, the conventional circuit configurations have only limited effect in improving conversion efficiency.

DESCRIPTION OF THE DRAWINGS

FIG. 16 is an equivalent circuit diagram illustrating a main part of the power conversion apparatus of the first embodiment when a first switch S1 is turned on.

DETAILED DESCRIPTION

In general, according to one embodiment, the power conversion apparatus will be explained with reference to the drawings.

As an embodiment, there is provided a first LC circuit, which is connected with an AC power supply and which has a first capacitor and a first inductor connected in series, a first switch connected to the AC power supply via the first LC circuit, a second switch connected in series to the first switch, a smoothing capacitor connected in parallel with the serial circuit of the first switch and the second switch, a second LC circuit, which is connected between a load and a connection point between the first switch and the second switch, and which has a second capacitor and a second inductor connected in series with each other, an input voltage detector that detects the voltage between both ends of the AC power supply as the input voltage, an input current detector that detects the current flowing in the first inductor of the first LC circuit as the input current, an output voltage detector that detects the voltage applied to the load as the output voltage, an output current detector that detects the current flowing in the second inductor of the second LC circuit as the output current, a polarity determination unit, and a pulse generator.

The polarity determination unit determines the polarity of the input voltage detected by the input voltage detector. The pulse generator carries out pulse driving for the first switch when the polarity of the input voltage is positive, and carries out pulse driving for the second switch when the polarity is negative, with the pulse driving being carried out at an on/off timing determined on the basis of the respective detection outputs of the input voltage detector, the input current detector, the output voltage detector and the output current detector.

First Embodiment

Figure 1:
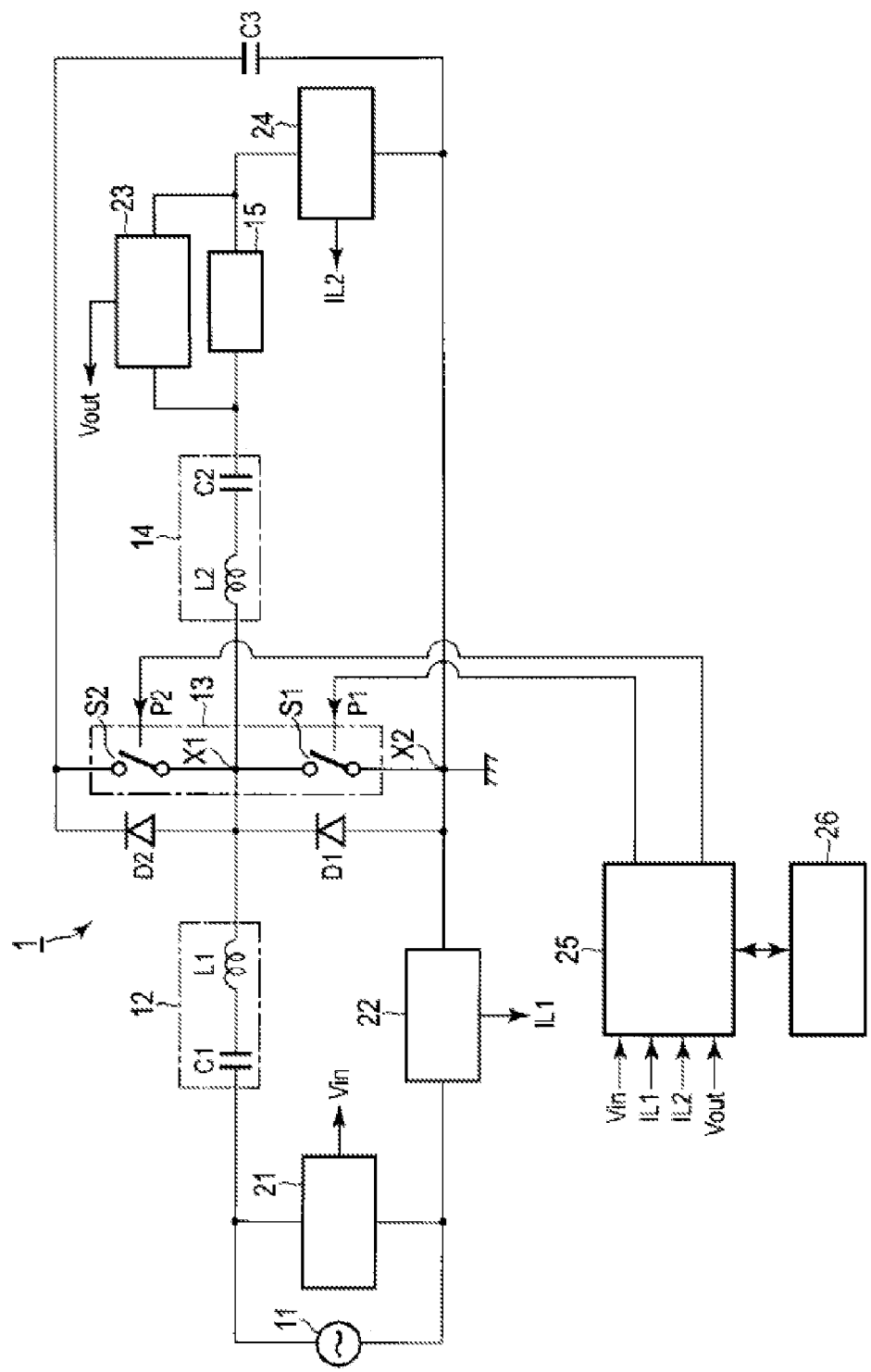
FIG. 1 is a diagram illustrating the configuration of the circuit of the power conversion apparatus common in each embodiment of the present invention.

FIG. 1 is a diagram illustrating the circuit configuration of the power conversion apparatus 1 in the first embodiment.

Here, in the power conversion apparatus 1, a first LC circuit 12, which includes a first capacitor C1 and a first inductor L1 connected in series with each other, is connected to one end (tap) of an AC power supply 11. In addition, a first switch S1 is connected in series to the first LC circuit 12, and the first switch S1 is ultimately connected to the other end (tap) of the AC power supply 11.

In addition, in the power conversion apparatus 1, a second switch S2 is connected at the connection point X1 between the first LC circuit 12 and the first switch S1, forming a serial circuit 13 of the first switch S1 and the second switch S2. In addition, a smoothing capacitor C3 is connected in parallel with the serial circuit 13. The connection point X2 between the first switch S1 and the smoothing capacitor C3 is at ground potential GND.

The first switch S1 and the second switch S2 are mechanical switches. In the power conversion apparatus 1, a first diode D1 is connected in parallel with the first switch S1, and a second diode D2 is connected in parallel with the second switch S2. Specifically, a cathode of the first diode D1 and an anode of the second diode D2 are connected to the connection point X1 between the first switch S1 and the second switch S2.

In the power conversion apparatus 1, the second LC circuit 14, including a second capacitor C2 and a second inductor L2 connected in series, is also connected to the connection point X1 between the first switch S1 and the second switch S2. A load 15 is connected between the second LC circuit 14 and ultimately to the connection point X2. The load 15 may be a heater such as a resistor member. It may be possible that a load, such as a set of equipment or the like, is connected to a circuit to make a DC circuit for another potential from the secondary side by insulated rectification with a transformer.

The power conversion apparatus 1 includes an input voltage detector 21, an input current detector 22, an output voltage detector 23, an output current detector 24, and a controller 25.

The input voltage detector 21 detects the positive or negative voltage (AC input voltage Vin) generated at both ends (taps) of the AC power supply 11. The input current detector 22 detects, as the input current IL1, the current flowing in the first inductor L1 of the first LC circuit 12. The output voltage detector 23 detects the DC output voltage Vout applied to the load 15 from the second LC circuit 14. The output current detector 24 detects, as the output current IL2, the current flowing in the second inductor L2 of the second LC circuit 14. The respective signals detected by the input voltage detector 21, the input current detector 22, the output voltage detector 23 and the output current detector 24 are output to the controller 25.

The controller 25 has a polarity determination unit and a pulse generator. These functions are realized according to a power conversion program stored in a program memory 26.

Figure 2:
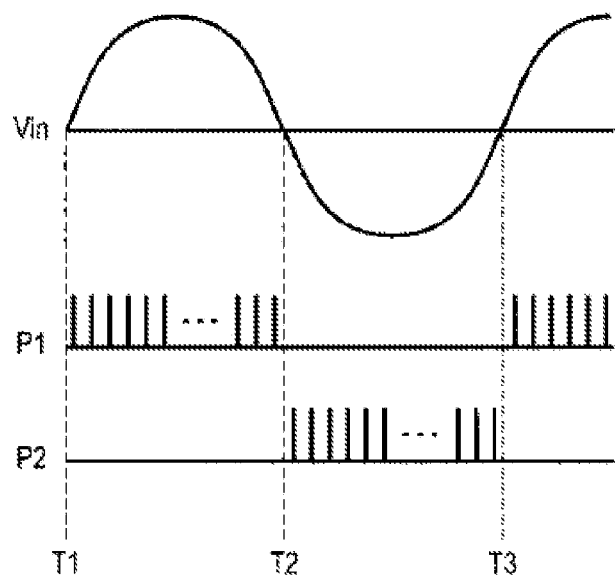
FIG. 2 is a time chart illustrating the output waveforms of the pulse signals P1, P2 versus the voltage Vin of the AC power supply in the power conversion apparatus.

The polarity determination unit determines whether the polarity of the voltage Vin of the AC power supply 11 detected by the input voltage detector 21 is positive or negative. The pulse generator of the controller 25 generates a first pulse signal P1 to pulse drive the first switch S1 and a second pulse signal P2 to pulse drive the second switch S2 each at an on/off timing determined on the basis of the respective detected outputs of the input voltage detector 21, the input current detector 22, the output voltage detector 23 and the output current detector 24. Specifically, as shown in FIG. 2, when the polarity of the AC input voltage Vin is positive, the first pulse signal P1 is generated, while if the polarity is negative, the second pulse signal P2 is generated.

The frequency of the pulse periods of the first pulse signal P1 and the second pulse signal P2 is much higher than the frequency of the AC power supply 11. The controller 25 operates so that the first pulse signal P1 is output to the first switch S1, and the first switch S1 is switching with a frequency higher than that of the output frequency of the AC power supply 11. In addition, the controller 25 operates so that the second pulse signal P2 is output to the second switch S2, and the second switch S2 is switching with a frequency higher than that of the frequency output of the AC power supply 11.

In the following, the operation of the power conversion apparatus 100 will be explained with reference to FIGS. 3 to 12. First of all, the operation when the polarity of the voltage Vin of the AC power supply 101 is positive will be explained with reference to FIGS. 3 to 7. When the polarity of the voltage Vin of the AC power supply 101 is positive, the first pulse signal P1 is output from the controller 110, and the first switch S1 is turned on/off repeatedly.

Figure 3:
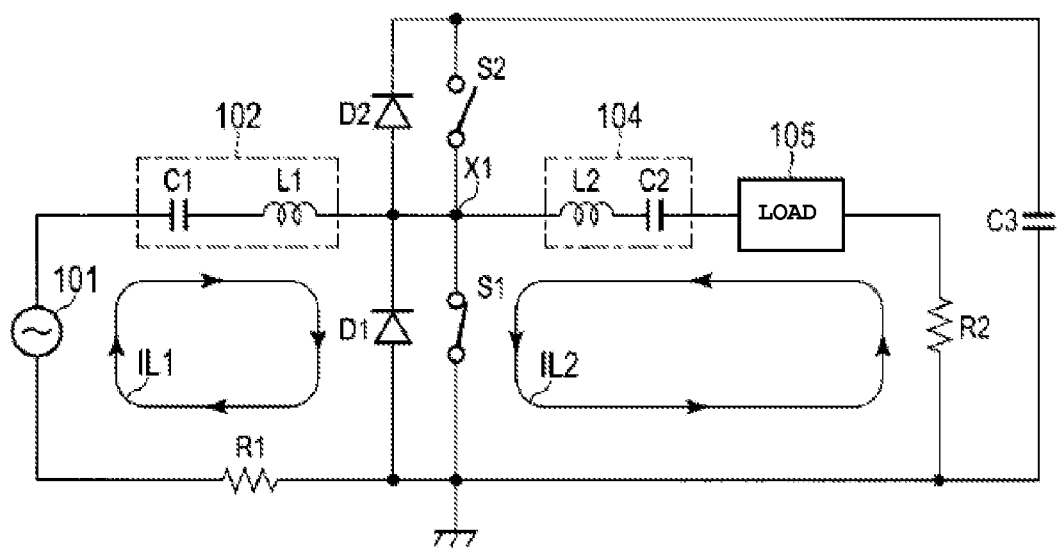
FIG. 3 is a schematic diagram illustrating the states of the circuit currents IL1, IL2 in the operation mode [Phase 1] in the power conversion apparatus in a first embodiment.

When the first switch S1 is closed, as shown in FIG. 3, a closed circuit is constituted by the AC power supply 101, the first LC circuit 102, the first switch S1 and the resistor R1. As a result, due to the linear reactance function of the first inductor L1, the first current IL1 flows from the first capacitor C1 via the first switch S1 to the ground potential GND. In addition, when the first switch S1 is closed, a closed circuit is also constituted by the first switch S1, the resistor R2, the load 105 and the second LC circuit 104. As a result, the second current IL2 flows from the second capacitor C2 via the first switch S1 to the ground potential GND. This operation mode is called [Phase 1].

Figure 4:
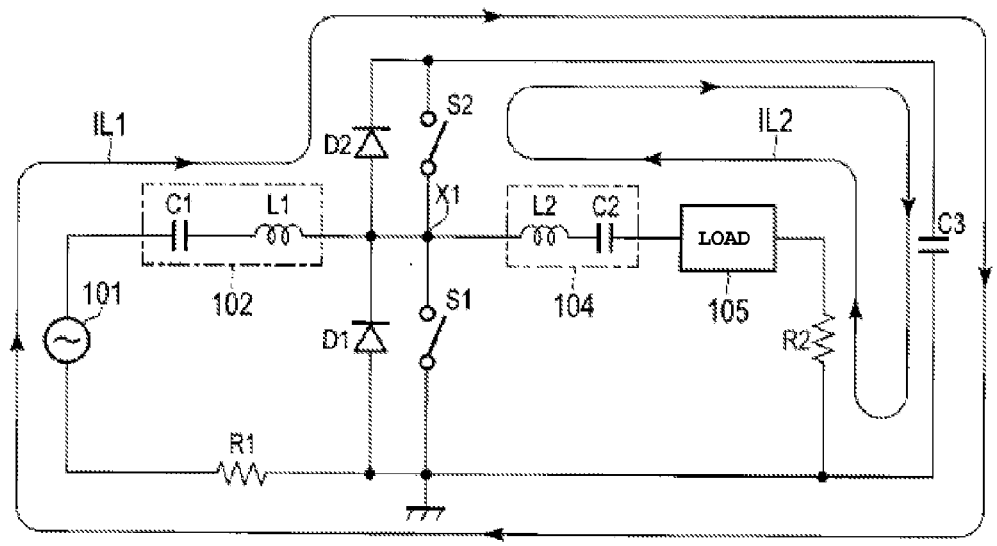
FIG. 4 is a schematic diagram illustrating the states of the circuit currents IL1, IL2 in the operation mode [Phase 2] in the power conversion apparatus in the first embodiment.

In the operation mode [Phase 1], the first current IL1 increases linearly at a gradient proportional to the voltage Vin of the AC power supply 101. Together with such increase in the first current IL1, the second current IL2 also increases. Then, when the first switch S1 is opened by the controller pulse, the first current IL1 keeps flowing in the same direction in the first inductor L1. Consequently, as shown in FIG. 4, the first current IL1 flows via the second diode D2 to the smoothing capacitor C3. Similarly, the second current IL2 also flows via the second diode D2 to the smoothing capacitor C3. This operation mode is called [Phase 2].

In the operation mode [Phase 2], the first current IL1 decreases at a gradient corresponding to the difference in potential between the smoothing capacitor C3 and the first capacitor C1. Similarly, the second current IL2 also decreases at a gradient corresponding to the difference in potential between the smoothing capacitor C3 and the second capacitor C2.

Figure 5:
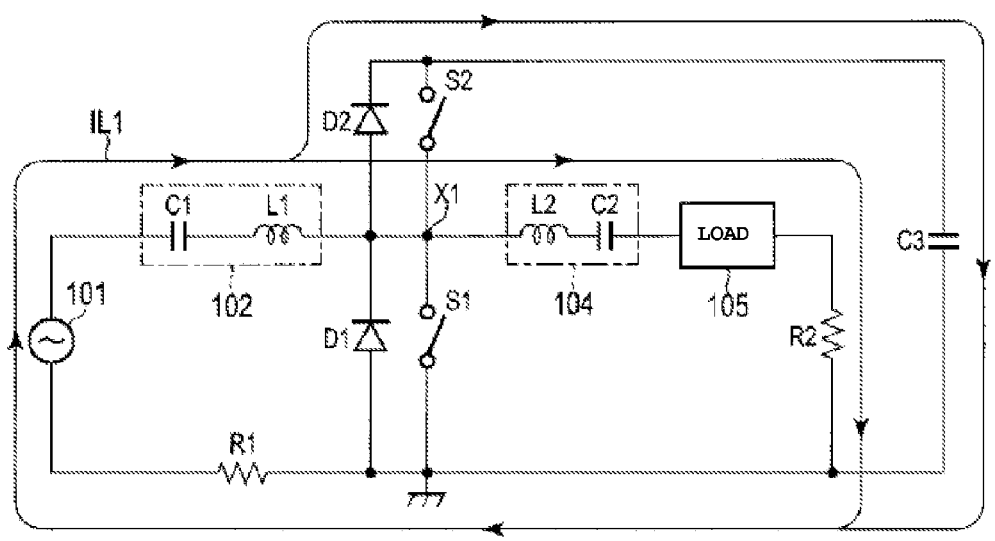
FIG. 5 is a schematic diagram illustrating the states of the circuit currents IL1, IL2 in the operation mode [Phase 3] in the power conversion apparatus in the first embodiment.

On the other hand, the potential of the smoothing capacitor C3 rises due to the concurrent flow of the first current IL1 and second current IL2 therethrough. Then, as the second inductor L2 exhausts the reactive energy, the second current IL2 inverts. However, at this time point, as the value of the first current IL1 is large, as shown in FIG. 5, a part of the first current IL1 flows via the second LC circuit 104. This operation mode is called [Phase 3].

In the operation mode [Phase 3], the remainder of the first current IL1 flows in the second diode D2. Consequently, the potential Vm at the connection point X1 between the first switch S1 and the second switch S2 becomes equal to the potential of the smoothing capacitor C3.

Figure 6:
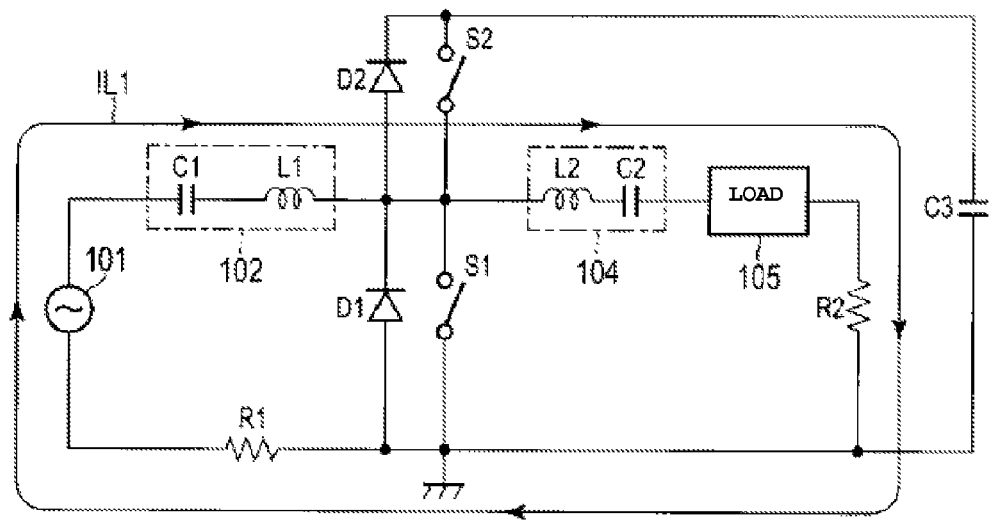
FIG. 6 is a schematic diagram illustrating the states of the circuit currents IL1, IL2 in the operation mode [Phase 4] in the power conversion apparatus in the first embodiment.

In the operation mode [Phase 3], the first current IL1 decreases. Then, as shown in FIG. 6, the first current IL1 flowing via the second diode D2 to the smoothing capacitor C3 stops flowing. As a result, the first current IL1 detected by the first current detector 107 and the second current IL2 detected by the second current detector 108 become equal to each other. That is, the controller 110 determines that the current state is balanced. This operation mode is called [Phase 4].

In the operation mode [Phase 4], no current flows via the second diode D2. Consequently, the potential Vm at the connection point X1 becomes the middle voltage between the voltage of the smoothing capacitor C3 and the ground potential GND.

Figure 7:
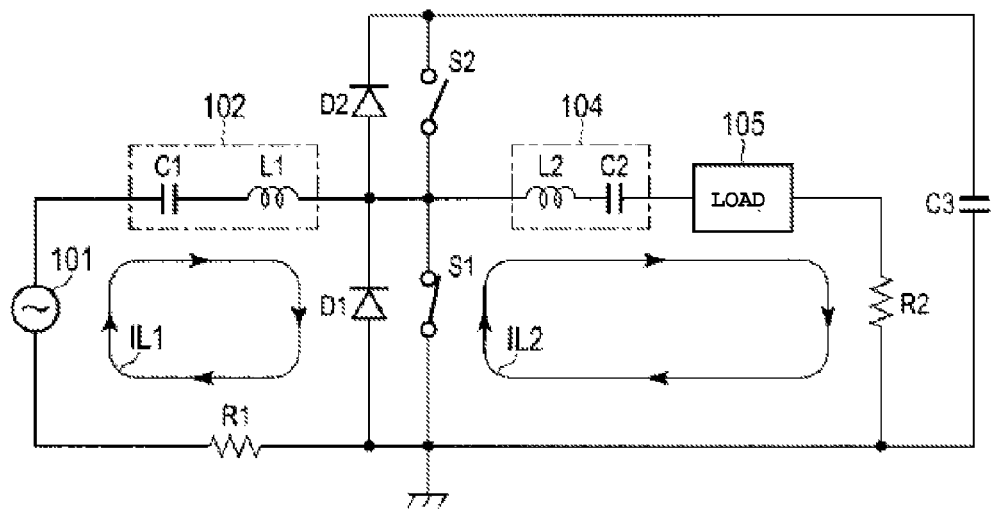
FIG. 7 is a schematic diagram illustrating the states of the circuit currents IL1, IL2 in the operation mode [Phase 5] in the power conversion apparatus in the first embodiment.

When it is determined that the current state has been balanced, the controller 110 closes switch S1 again. As a result, as shown in FIG. 7, the first current IL1 flowing from the first LC circuit 102 to the second LC circuit 104 flows entirely via the first switch S1. Consequently, the potential Vm at the connection point X1 becomes equal to the ground potential GND. In this case, due to the reactive energy, the second current IL2 keeps flowing in the second inductor L2 in the same direction as that in the operation mode [Phase 4]. Consequently, the second current IL2 flows in the direction from the ground potential GND to the potential of the second capacitor C2. This operation mode is called [Phase 5].

Then, when the potential of the second capacitor C2 becomes higher than the ground potential GND, the direction of the second current IL2 is inverted. That is, the operation mode returns to the operation mode [Phase 1]. Then, during the period when the polarity of the voltage of the AC power supply 101 is positive, in the power conversion apparatus 100, the cycle of operation modes: [Phase 1]→[Phase 2]→[Phase 3]→[Phase 4]→[Phase 5]→[Phase 1] is repeated.

In the following, the operation when the polarity of the voltage of the AC power supply 101 is negative will be explained with reference to FIGS. 8 to 12. When the polarity of the voltage Vin of the AC power supply 101 is negative, the second pulse signal P2 is output from the controller 110, and the second switch S2 is opened and closed repeatedly.

Figure 8:
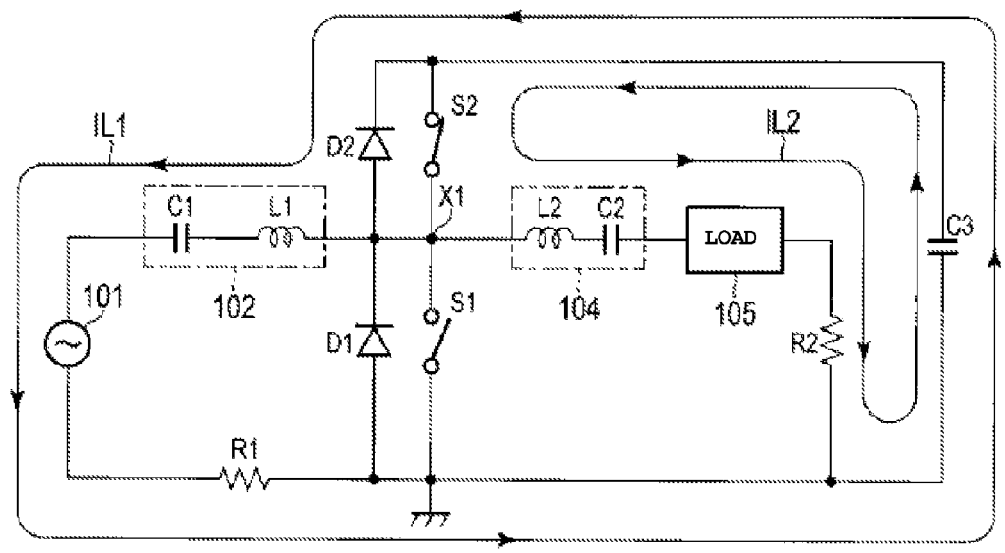
FIG. 8 is a schematic diagram illustrating the states of the circuit currents IL1, IL2 in the operation mode [Phase 6] in the power conversion apparatus in the first embodiment.

As shown in FIG. 8, when the second switch S2 is closed, a closed circuit is constituted by the AC power supply 101, the first LC circuit 102, the second switch S2 and the smoothing capacitor C3. In this case, the voltage of the smoothing capacitor C3 is higher than the AC voltage Vin. Consequently, the charging voltage for the smoothing capacitor C3 is provided in the first current IL1 so that it returns to the AC power supply 101 side via the first switch S1 and the first LC circuit 102. At the same time, via the load 105, a closed circuit is constituted by the second LC circuit 104, the first switch S1, the smoothing capacitor C3 and the resistor R2. As a result, the second current IL2 flows from the smoothing capacitor C3 with a higher potential towards the second capacitor C2 with a lower potential. This operation mode is called [Phase 6].

Figure 9:
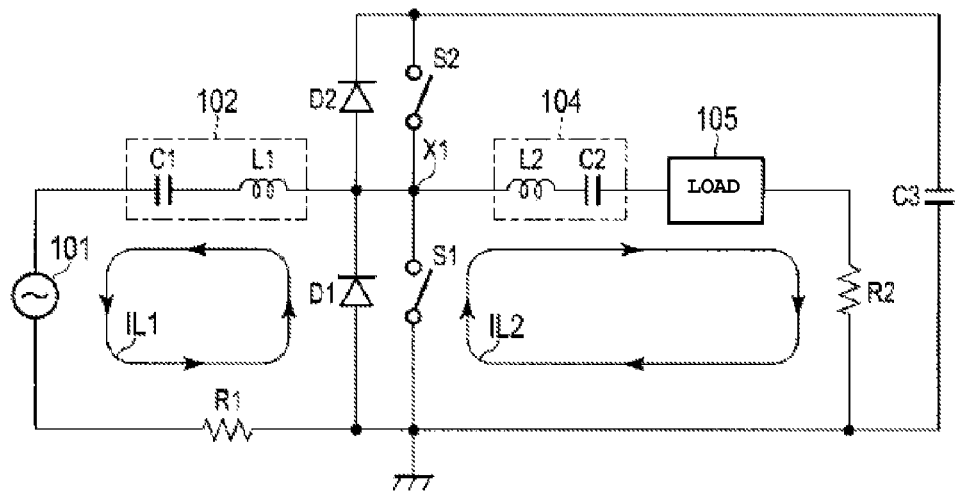
FIG. 9 is a schematic diagram illustrating the states of the circuit currents IL1, IL2 in the operation mode [Phase 7] in the power conversion apparatus in the first embodiment.

Then, when the second switch S2 is opened by the controller, the first current IL1 keeps flowing in the first inductor L1 in the same direction as that in the operation mode [Phase 6]. Consequently, as shown in FIG. 9, the first current IL1 flows via the first diode D1 in the direction for making the current flow from the ground potential GND to the potential of the first capacitor C1. Similarly, the second current IL2 flows via the first diode D1 in the direction for making the current flow from the ground potential GND to the potential of the second capacitor C2. This operation mode is called [Phase 7].

Figure 10:
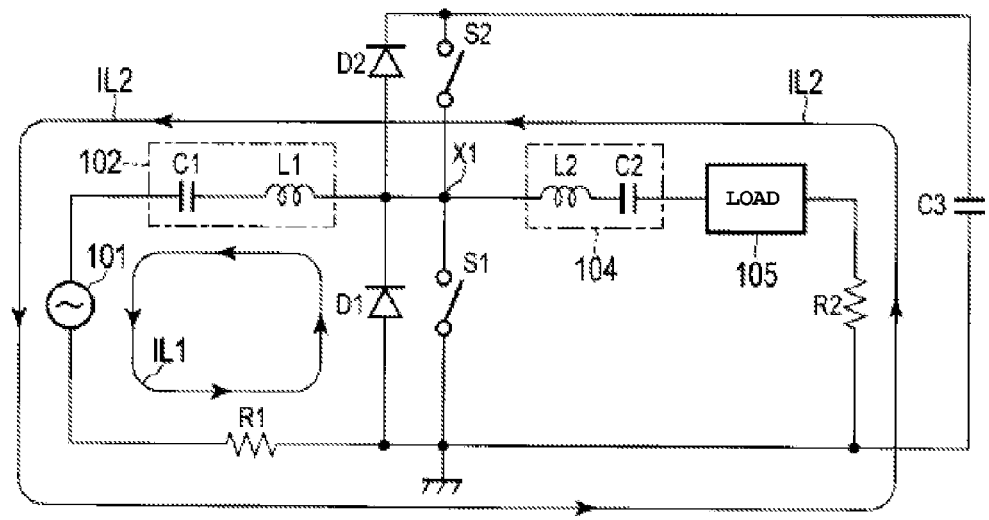
FIG. 10 is a schematic diagram illustrating the states of the circuit currents IL1, IL2 in the operation mode [Phase 8] in the power conversion apparatus in the first embodiment.

Then, when the potential of the second capacitor C2 becomes higher than the ground potential GND, the direction of the second current IL2 is inverted. As a result, as shown in FIG. 10, the second current IL2 flows in the direction of the first LC circuit 102. This operation mode is called [Phase 8].

In the operation mode [Phase 8], the current flowing from the ground potential GND via the first diode D1 decreases by an amount corresponding to the second current IL2 flowing from the ground potential GND to the second capacitor C2 in the operation mode [Phase 7]. However, at this time, the first current IL1 is larger than the second current IL2, so that the potential Vm at the connection point X1 becomes equal to the ground potential GND.

Figure 11:
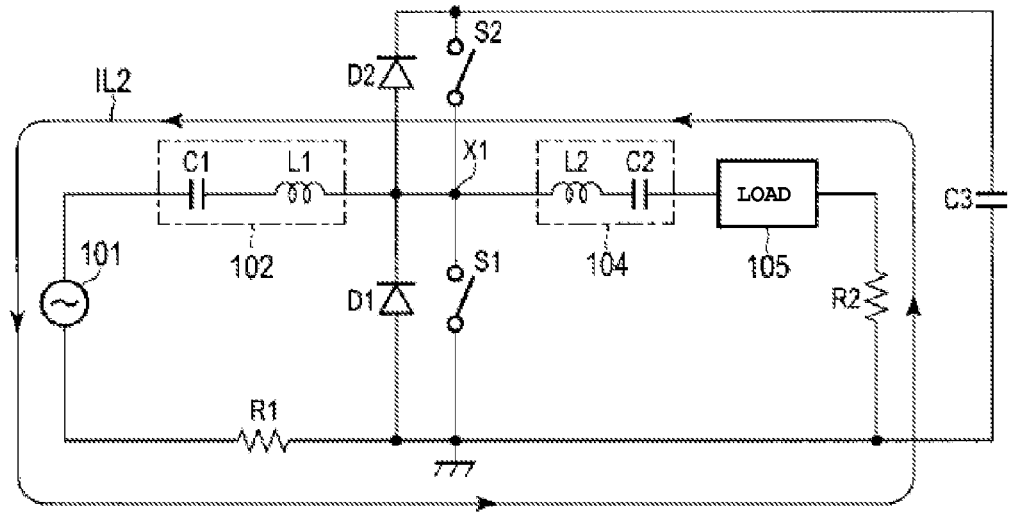
FIG. 11 is a schematic diagram illustrating the states of the circuit currents IL1, IL2 in the operation mode [Phase 9] in the power conversion apparatus in the first embodiment.

Thereafter, the current flowing via the first diode D1 stops. When the first current IL1 becomes equal to the second current IL2, as shown in FIG. 11, the first current IL1 flowing via the first diode D1 stops. As a result, the first current IL1 detected by the first current detector 107 and the second current IL2 detected by the second current detector 108 are equal to each other. That is, the controller 110 determines that the current state is balanced. This operation mode is called [Phase 9].

In the operation mode [Phase 9], the current does not flow via the first diode D1, so that the potential Vm at the connection point X1 becomes an intermediate voltage between the voltage of the smoothing capacitor C3 and the ground potential GND.

Figure 12:
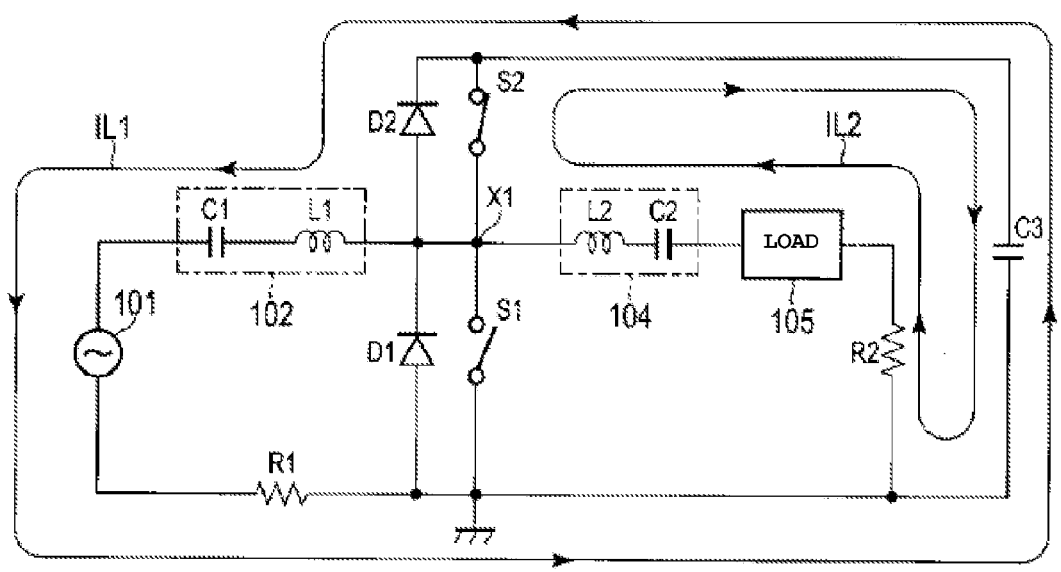
FIG. 12 is a schematic diagram illustrating the states of the circuit currents IL1, IL2 in the operation mode [Phase 10] in the power conversion apparatus in the first embodiment.

When the controller 110 determines that the current state is balanced, the second switch S2 is closed. As a result, a closed circuit is constituted by the AC power supply 101, the first LC circuit 102, the second switch S2, the smoothing capacitor C3 and the resistor R1. Consequently, as shown in FIG. 12, the first current IL1 flows from the smoothing capacitor C3 via the second switch S2 to the first LC circuit 102. When the second switch S2 is closed, a closed circuit is also constituted by the second switch S2, the smoothing capacitor C3, the resistor R2, the load 105 and the second LC circuit 104. As a result, the second current IL2 also flows from the second capacitor C2 via the second switch S2 to the smoothing capacitor C3. This operation is called [Phase 10].

Then, when the potential of the smoothing capacitor C3 becomes higher than the potential of the second capacitor C2, the direction of the second current IL2 is inverted. That is, the operation mode returns to [Phase 6]. After that, during the period when the polarity of the voltage of the AC power supply 101 is negative, in the power conversion apparatus 100, the cycle of operation modes: [Phase 6]→[Phase 7]→[Phase 8]→[Phase 9]→[Phase 10]→[Phase 6] is repeated.

Figure 13:
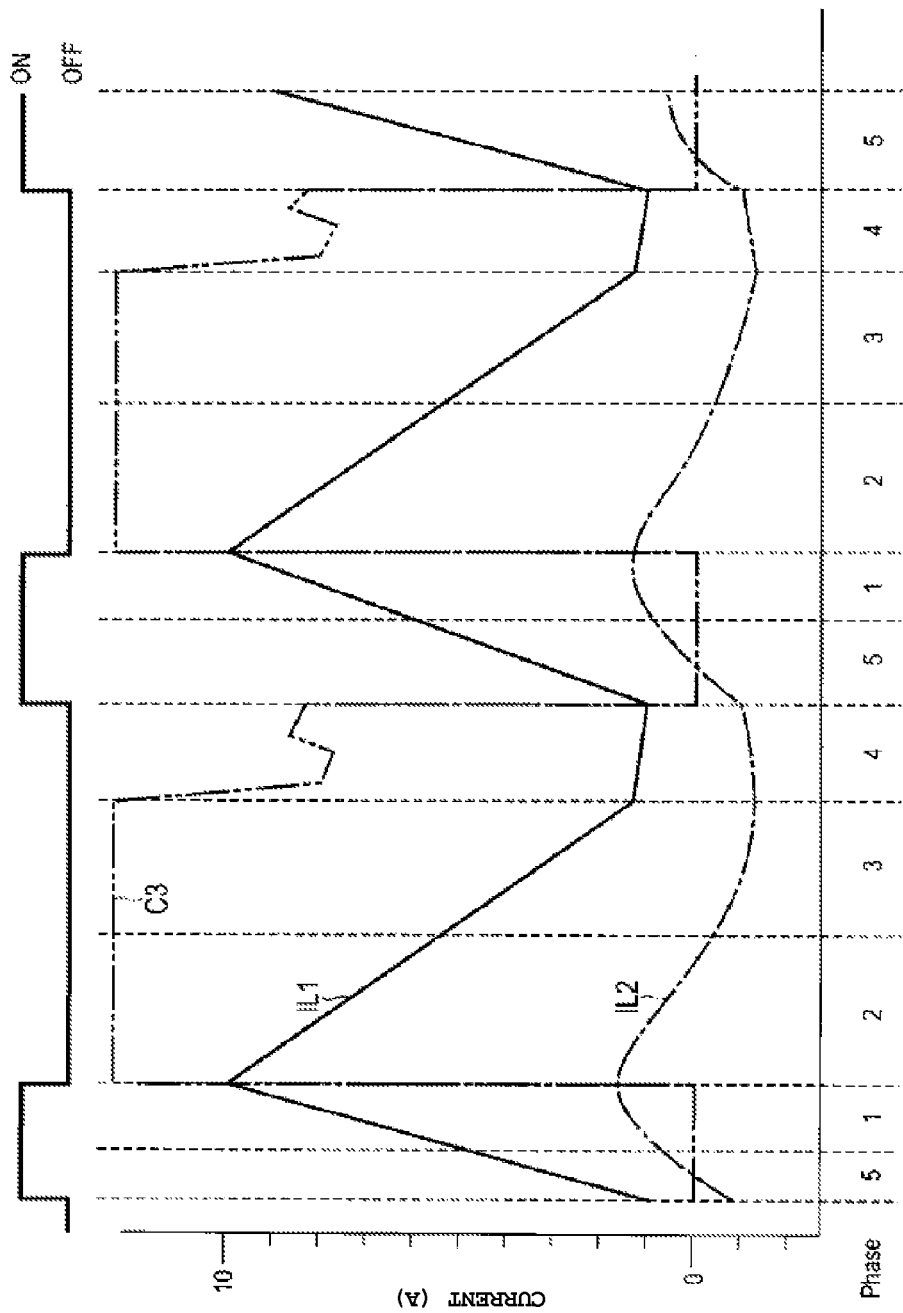
FIG. 13 is a waveform diagram illustrating the circuit currents IL1, IL2 in the operation modes [Phase 1] to [Phase 5] and the voltage Vm at the connection point x1 between the first switch and the second switch in the first embodiment.

FIG. 13 is a diagram illustrating the waveforms of the switch signal and the first current IL1, the second current IL2 and the voltage Vm at the connection point X1 in the operation modes of [Phase 1], [Phase 2], [Phase 3], [Phase 4], and [Phase 5] when the polarity of the voltage of AC power supply 101 is positive. As shown in the drawing, the period when the voltage is unstable while the voltage Vm is unstable corresponds to the operation mode [Phase 4]. In this period, the first current IL1 has a value substantially equal to the second current IL2 although they have opposite gradients. In the case shown in FIG. 13, the first current IL1 is about 1 [A], while the second current IL2 is about −1 [A]. In this case, the current balance determination section 113 determines that the current state is balanced. When the current state is balanced, the gradient of the first current IL1 and the second current IL2 becomes gradual.

Figure 14:
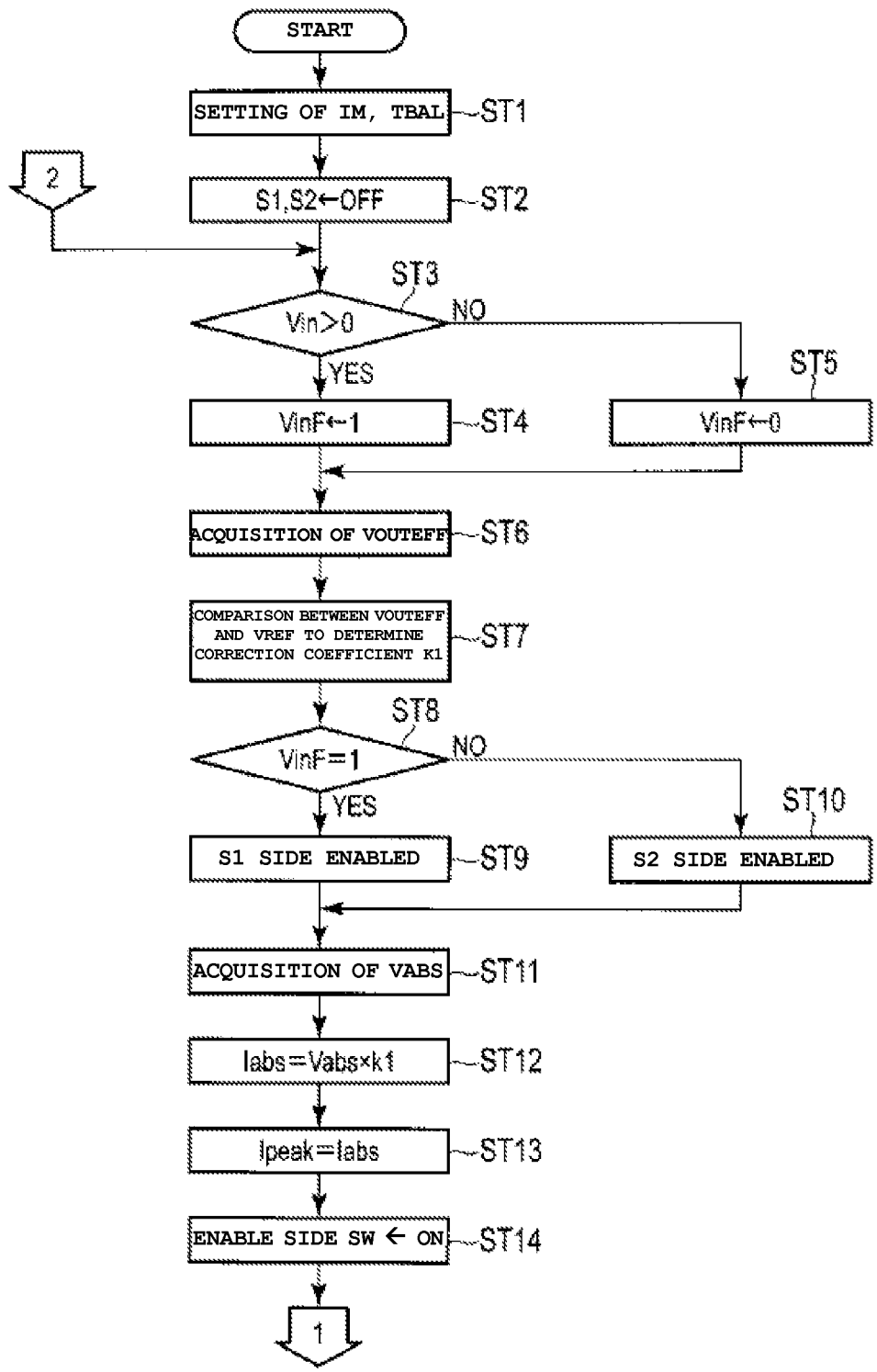
FIG. 14 is a flow chart illustrating a sequence control executed by a controller in the power conversion apparatus in the first embodiment.
Figure 15:
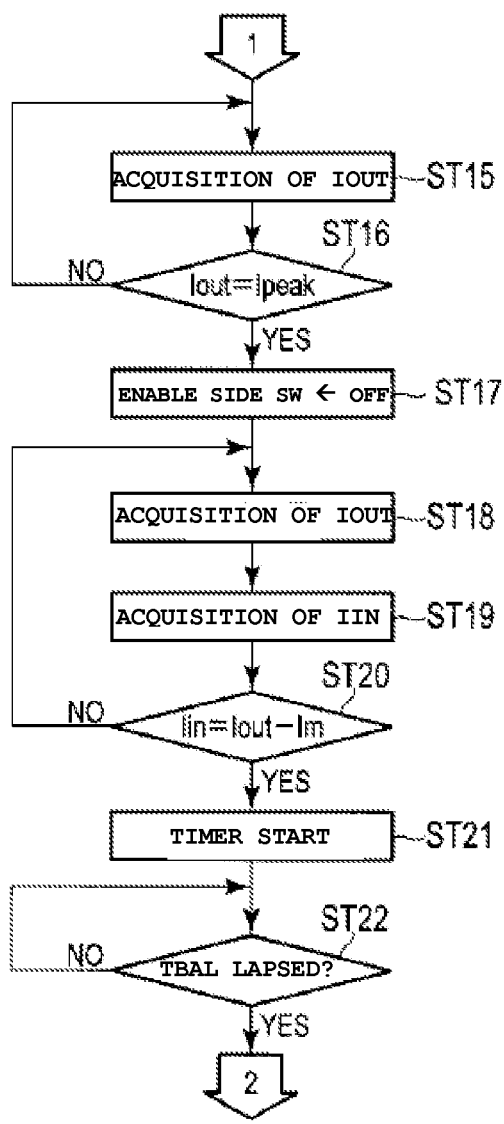
FIG. 15 is a flow chart illustrating the steps of operation of step ST14 and thereafter in the sequence control shown in FIG. 14.

The controller 25 executes the sequence control by the flow charts shown in FIGS. 14 and 15 according to the power conversion program stored in the program memory 26. When the power conversion program is started, the controller 25 carries out the initialization process by setting the current comparison margin Im and the margin Tbal of the current balance determination time at default values (ST1). In addition, the first switch S1 and the second switch S2 are open or controlled to the open position. That is, both the first pulse signal P1 and the second pulse signal P2 are set at "L (Low)" level (ST2).

Here, the current comparison margin Im refers to the tolerable range where it is possible to determine that the input current IL1 and the output current IL2 are equal to each other. The margin Tbal of the current balance determination time refers to the time duration required to determine the balanced state, i.e. where the input current IL1 and the output current IL2 are equal, or within a tolerance range, substantially equal, to each other.

Then, the controller 25 acquires the input voltage Vin as detected by the input voltage detector 21. Then, it determines whether the polarity of the input voltage Vin is positive or negative (ST3). If the potential of the input voltage Vin is 0 level or more, the controller 25 recognizes that the polarity of the input voltage Vin is positive. On the contrary, if the potential of the input voltage Vin is lower than 0 level, the controller 25 recognizes that the polarity of the input voltage Vin is negative.

When the polarity of the input voltage Vin is positive (YES in ST3), the controller 25 sets the input voltage polarity flag VinF at "1" (ST4). When the polarity of the input voltage Vin is negative (NO in ST3), the controller 25 resets the input voltage polarity flag VinF at "0" (ST5). The input voltage polarity flag VinF is formed in the RAM region built in the controller 25.

Then, the controller 25 acquires the value of the output voltage Vout as detected by the output voltage detector 23. Then, it computes the effective value Vouteff of the output voltage Vout (ST6).

The controller 25 compares the output voltage effective value Vouteff with a preset reference voltage Vref, and then, it computes a correction coefficient k1 for the output voltage Vout so that the output voltage effective value Vouteff approaches the reference voltage Vref (ST7).

The correction coefficient k1 is a coefficient used in feedback of the variation in the output voltage to the switching control. The value obtained by subtracting the reference voltage Vref from the output voltage effective value Vouteff (Vouteff-Vref) is defined as the voltage difference Vdif. When the voltage difference Vdif is positive, the correction coefficient k1 takes a small (positive) value. On the other hand, when the voltage difference Vdif is negative, the correction coefficient k1 takes a large (positive) value. When the voltage difference Vdif is "0", the correction coefficient k1 is "1".

The controller 25 then checks the input voltage polarity flag VinF (ST8). If the input voltage polarity flag VinF is "1", the information that sets the first switch S1 in the enable state is stored in the RAM region (ST9). On the other hand, when the input voltage polarity flag VinF is "0", the information that sets the second switch S2 in the enable state is stored in the RAM region (ST10).

Then, the controller 25 acquires the absolute value (instantaneous value) Vabs of the input voltage Vin detected by the input voltage detector 21 (ST11). Then, the correction coefficient k1 is multiplied on the input voltage absolute value (instantaneous value) Vabs to compute the mean current Iabs as a control target (ST12). The controller 25 stores the computed mean current Iabs as a peak current Ipeak that is a target current in the RAM region (ST13).

Then, the controller 25 closes the first switch S1 or the second switch S2, whichever is on the side of the enable state. That is, when the first switch S1 is in the enable state, the first pulse signal P1 is on the "H (High)" level, and when the second switch S2 is in the enable state, the second pulse signal P2 is on the "H (High)" level (ST14).

When the first switch S1 or the second switch S2 is closed, the controller 25 acquires the absolute value (instantaneous value) Iout of the output current IL2 detected by the output current detector 24 (ST15). Then, it determines whether or not the output current absolute value (instantaneous value) Iout reaches the peak current Ipeak (ST16). If the output current absolute value (instantaneous value) Iout has not reached the peak current Ipeak (NO in ST16), the controller 25 repeats the process of steps ST15, ST16. That is, it stands by for the output current absolute value (instantaneous value) Iout to reach the peak current Ipeak.

When the output current absolute value (instantaneous value) Iout reaches the peak current Ipeak (YES in ST16), the controller 25 opens the first switch S1 or the second switch S2 based on which was in the enabled state. That is, when the first switch S1 is in the enabled state, the first pulse signal P1 is set on the "L" level, and, when the second switch S2 is in the enabled state, the second pulse signal P2 is set on the "L" level (ST17).

The controller 25 then acquires the absolute value (instantaneous value) Iout of the output current IL2 again (ST18). Also, the controller 25 acquires the absolute value (instantaneous value) Iin of the input current IL1 detected by the input current detector 22 (ST19). Then, a determination is made whether or not the input current absolute value (instantaneous value) Iin is equal to the target value Iout-Im obtained by subtracting the current comparison margin Im from the output current absolute value (instantaneous value) Iout (ST20). If the input current absolute value (instantaneous value) Iin is not equal to the target value Iout-Im (NO in ST20), the controller 25 repeats the process of the steps ST18, ST19, and ST20. That is, the controller 25 stands by for the input current absolute value (instantaneous value) Iin to become equal to the target value Iout-Im.

When the input current Iin becomes equal to the target value Iout-Im (YES in ST20), the controller 25 starts the built-in therein (ST21). Then, the controller 25 stands by for the time counted by the timer to reach the margin Tbal of the current balance determination time (ST22). If the time of the margin Tbal has passed (YES in ST22), the controller 25 returns to the process of step ST3. Then, the controller 25 repeatedly carries out the process of steps ST3 to ST22.

By the pulse driving of the first switch S1, the pulse generator (ST6 to ST22) accomplishes the cycle of operation modes: [Phase 1]→[Phase 2]→[Phase 3]→[Phase 4]→[Phase5]→[Phase 1]. With the pulse driving of the second switch S2, it accomplishes the cycle of operation modes: [Phase 6]→[Phase 7]→[Phase 8]→[Phase 9]→[Phase 10]→[Phase 6].

In this way, the power conversion apparatus 1 stands by for the current balanced state in which the input current Iin and the output current Iout are equal to each other within the tolerance range of the current comparison margin Im, and then causes the first switch S1 or the second switch S2 to shift to the ON (closed position) cycle. With such control, the power conversion apparatus 1 can cut the power loss. The reason will be explained with reference to FIGS. 16 and 17.

The power conversion apparatus 1 includes the second LC circuit 14. If the second LC circuit 14 is absent, when the polarity of the voltage of the AC power supply 11 is positive, the operation modes are only the mode [Phase 1] in which the first switch S1 is closed, and the mode [Phase 2] in which the first switch S1 is open.

Figure 16:
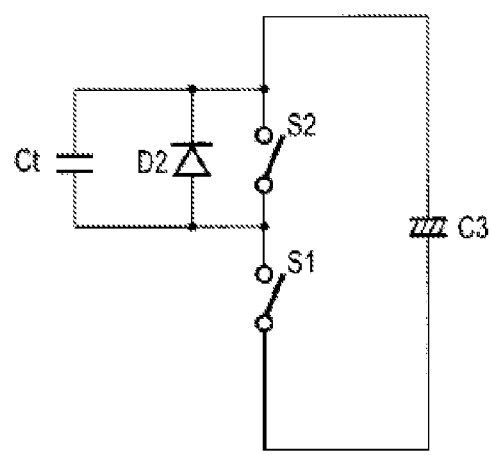
Figure 17:
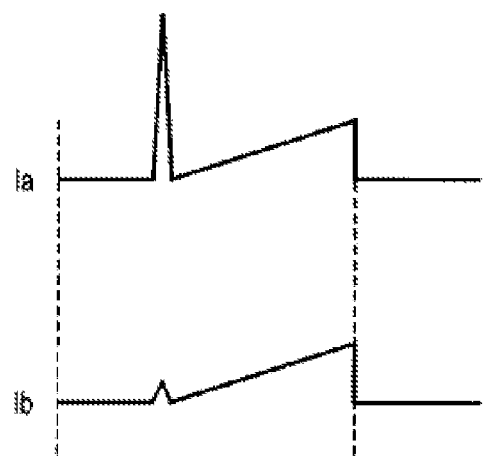
FIG. 17 is a time chart illustrating a current waveform when there is a second LC circuit and when there is not the second LC circuit in the power conversion apparatus in the first embodiment.

That is, in the operation mode [Phase 1], the first switch S1 is in the closed state, and the input current IL1 flows through the first switch S1. Then, in the operation mode [Phase 2], the first switch S1 is open, and the input current IL1 flows through the second diode D2. Then, the first switch S1 is closed again, and the input current IL1 flows through the first switch S1. As shown in FIG. 16, the equivalent circuit in this case corresponds to the configuration in which a parasitic capacitor Ct is connected in parallel with the second diode D2.

Here, the second diode D2 has a characteristics of recovery by the parasitic capacitor Ct, and it works as a capacitor until the state changes from the conductive state to the cutoff state. Consequently, when the mode returns from the operation mode [Phase 2] to the operation mode [Phase 1], the second switch S2, in the open state, functions as a capacitor, and, as the first switch S1 is closed, a current flowing from the smoothing capacitor C3 to the second switch S2 and the first switch S1 is generated. Consequently, as shown in the waveform Ia in FIG. 17, a spike current much higher than that in the normal case is generated. Due to this spike current, a switching loss takes place, and the power conversion efficiency of the power conversion apparatus degrades significantly.

On the other hand, the power conversion apparatus 1 having the second LC circuit 14 has the operation modes [Phase 3], [Phase 4], and [Phase 5] after the operation mode [Phase 2]. Especially, there is an operation mode [Phase 4], in which the current state is balanced with the input current IL1 and the output current IL2 nearly equal to each other. At the time point when the current state is balanced, the diode recovery (bypass) of the second switch S2 is complete. Consequently, even when the first switch S1 is closed in the next operation mode [Phase 5], as shown in the waveform Ib in FIG. 17, no through current is generated, i.e., switch S2 is not functioning as a capacitor in the circuit because of the presence of the diode D2. Consequently, for the power conversion apparatus 1, the power loss can be significantly improved. Also, in the state of the operation mode [Phase 4], the potential Vm at the connection point X1 is lower than the potential of the smoothing capacitor C3. Consequently, the variation in the voltage at the time of switching is small, so that the switching loss which is proportional to the voltage is smaller. Together with the decrease in the recovery loss, the power conversion loss can be significantly improved for the power conversion apparatus 1.

The same operation and effect as described above may also be realized when the voltage of the AC power supply 11 has a negative polarity, and the cycle of operation modes: [Phase 6]→[Phase 7]→[Phase 8]→[Phase 9]→[Phase 10]→[Phase 6] is repeated.

Second Embodiment

In the following, the second embodiment corresponding to the instantaneous power conversion apparatus will be explained with reference to the drawings. Here, the hardware configuration of the power conversion apparatus 1 is the same as that of the first embodiment. Consequently, FIG. 1 is also adopted here, and the hardware configuration will not be explained in detail again.

Figure 18:
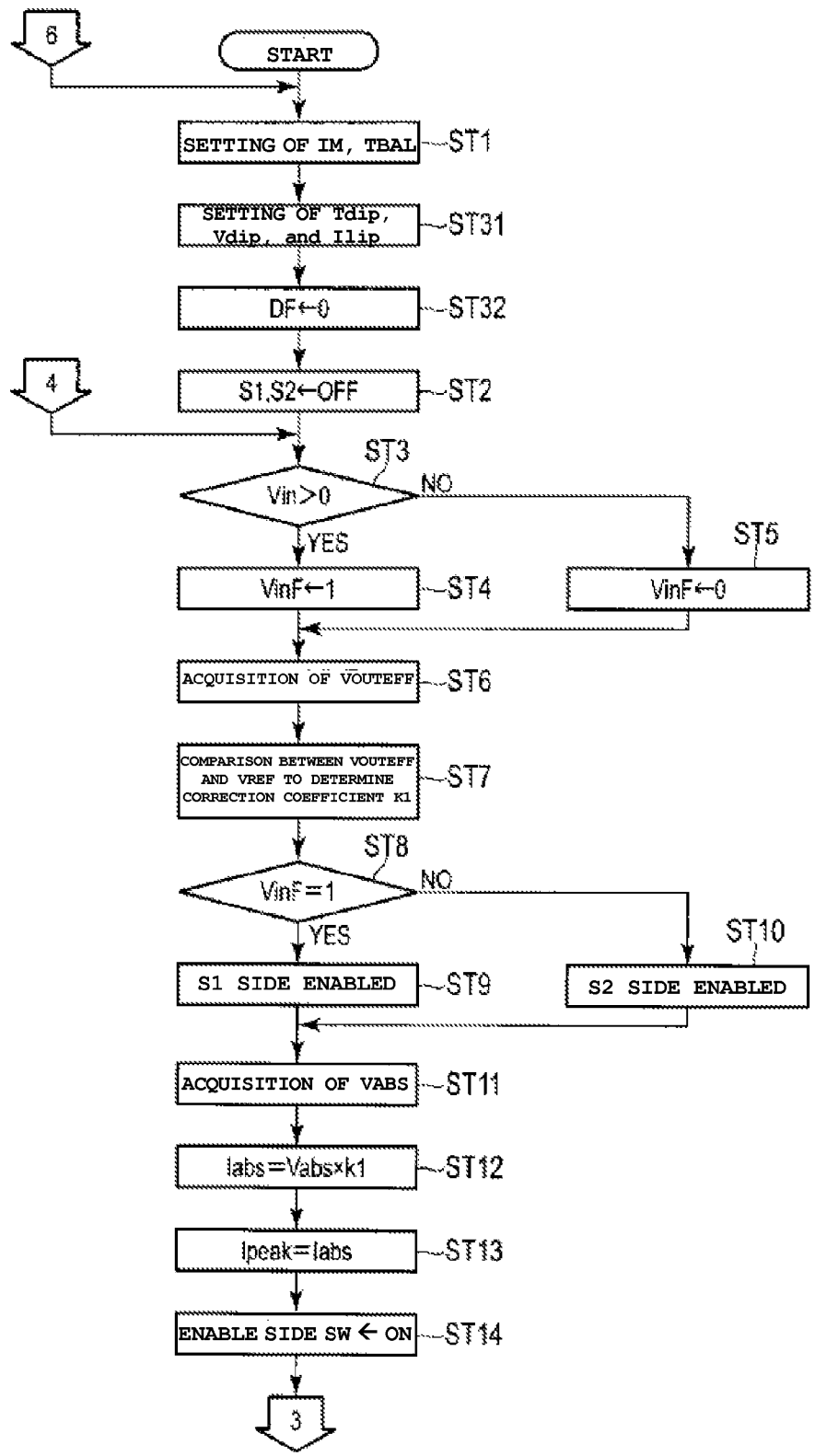
FIG. 18 is a flowchart illustrating the sequence control executed by the controller in the power conversion apparatus in a second embodiment.
Figure 19:
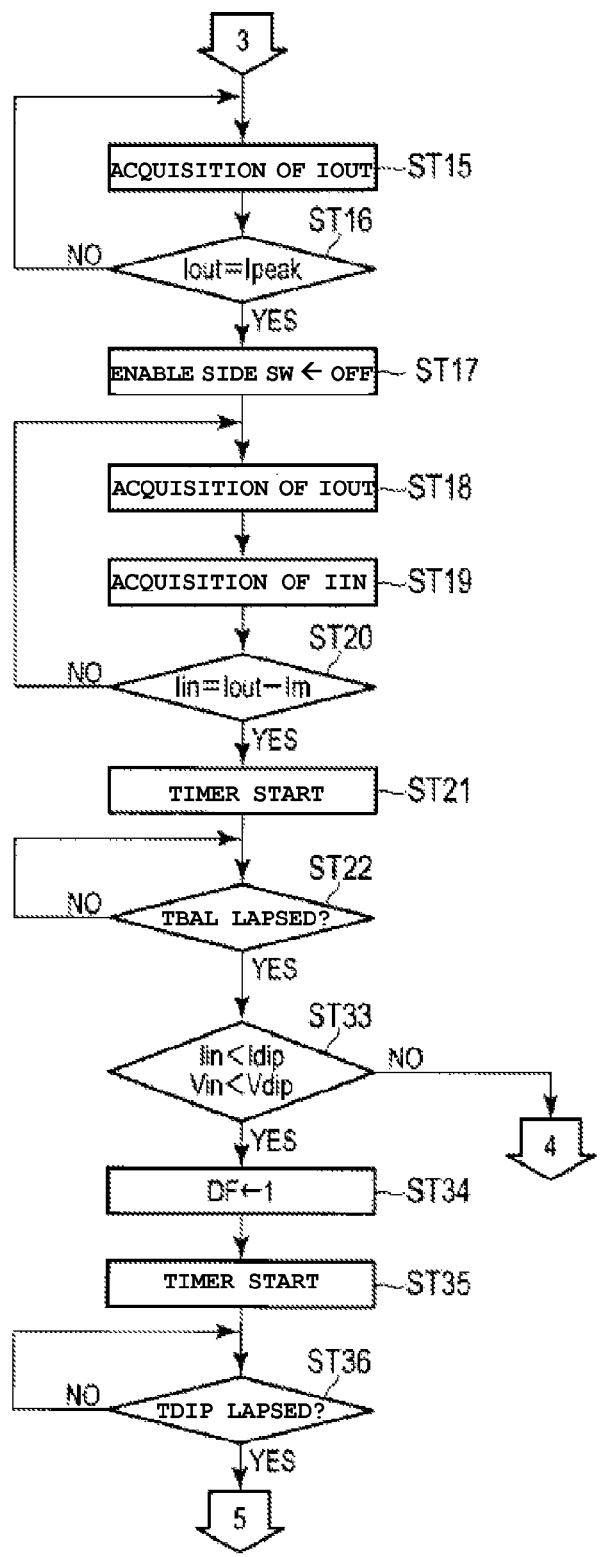
FIG. 19 is a flow chart illustrating the steps of operation of the step ST14 and thereafter in the sequence control shown in FIG. 18.
Figure 20:
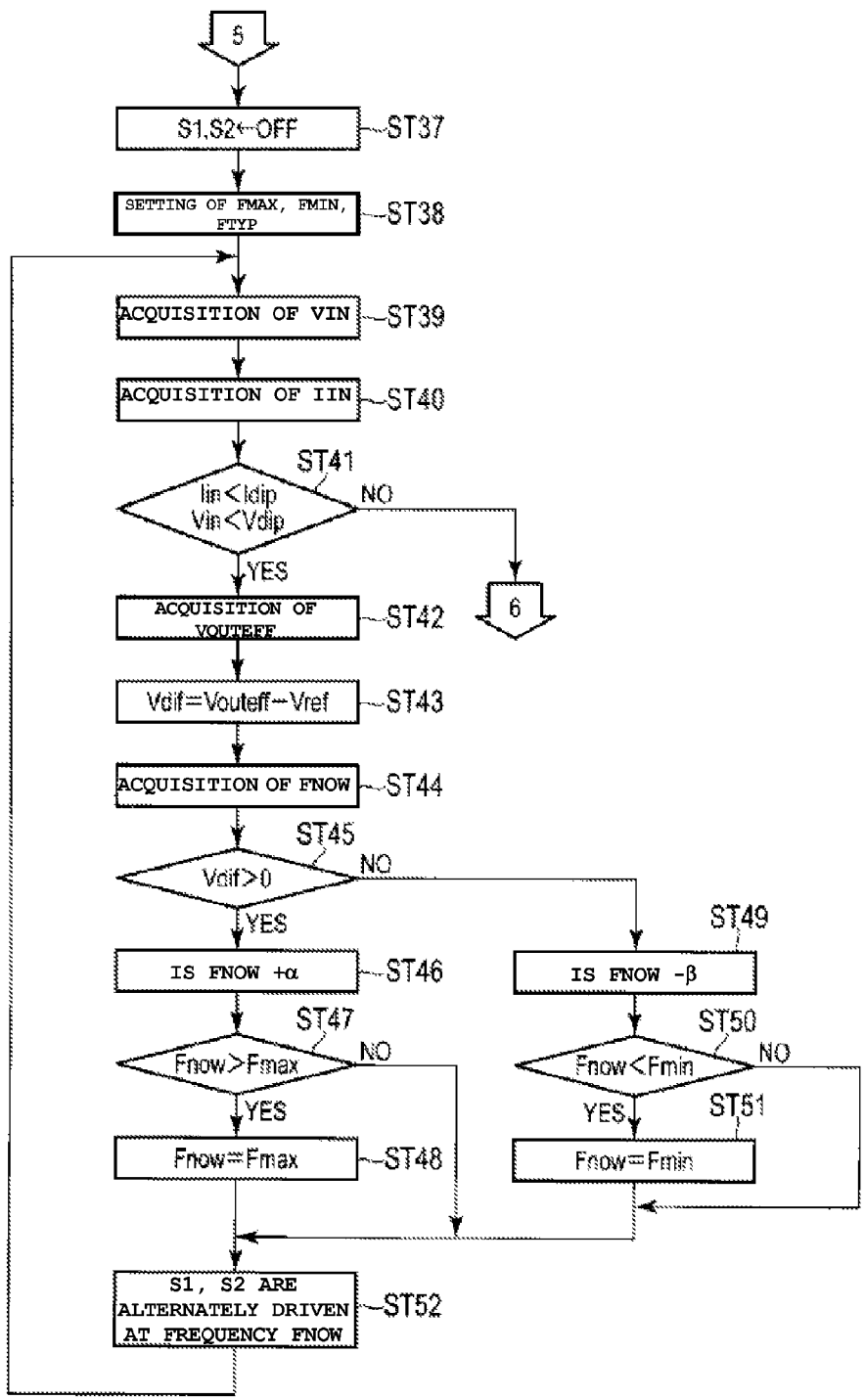
FIG. 20 is a flow chart illustrating the steps of operation of the step ST36 and thereafter in the sequence control shown in FIG. 19.

The second embodiment differs from the first embodiment in a part of the sequence control executed by the controller 25. The controller 25 carries out the sequence control with the steps of operation shown in the flow charts in FIGS. 18 to 20 according to the power conversion program stored in the program memory 26. The same reference numerals and letters as those in the above in FIGS. 14 and 15 for the first embodiment are adopted to represent the same steps of operation, and only the different steps of operation will be explained here.

That is, in the initialization process of steps ST1 to ST2, the controller 25 also sets the margin Tdip of the instantaneous power outage determination time, and the voltage margin Vdip and the current margin Idip in the instantaneous power outage are set at the default values (ST31). Also, the instantaneous power outage flag DF is reset at "0" (ST32).

Here, the margin Tdip of the instantaneous power outage determination time is the period needed for checking generation of the instantaneous power outage. The voltage margin Vdip in the instantaneous power outage is the tolerance range for determination that the output voltage Vout is the voltage in the instantaneous power outage state. The current margin Idip in the instantaneous power outage is the tolerance range for determination of the output current Iout in the instantaneous power outage state.

Then, the process of the steps ST3 to ST22 is the same as that in the first embodiment. In the first embodiment, with the process of step ST22, when it is detected that the time counted by the timer reaches the margin Tbal of the current balance determination time, the controller 25 returns to the process of the step ST3. In the second embodiment, it goes to the process of the step ST33.

That is, the controller 25 compares the input current absolute value (instantaneous value) Iin with the current margin Idip. Also, it compares the input voltage Vin with the voltage margin Vdip (ST33). As a result, when the input current absolute value (instantaneous value) Iin is lower than the current margin Idip, and the input voltage Vin is lower than the voltage margin Vdip, generation of the instantaneous power outage is recognized. Otherwise, it is recognized as that instantaneous power outage has not occurred (power outage determination unit).

When the instantaneous power outage does not take place (NO in ST33), the controller 25 returns to the process of the step ST3. That is, the same sequence control as that of the first embodiment is executed.

On the other hand, if an instantaneous power outage has taken place (YES in ST33), the controller 25 sets the instantaneous power outage flag DF at "1" (ST34). Then, the controller 25 starts the timer built therein (ST35). Then, it stands by until the time counted by the timer reaches the margin time Tdip of the instantaneous power outage determination (ST36).

If the counted time reaches the margin time Tdip (YES in ST36), the controller 25 turns off both the first switch S1 and the second switch S2 (i.e., opens the switches) (ST37). Also, the controller 25 sets the highest frequency Fmax, the lowest frequency Fmin and the initial frequency Ftyp at the default values (ST38).

Then, the controller 25 acquires the input voltage Vin detected by the input voltage detector 21 (ST39). Also, the controller 25 acquires the absolute value (instantaneous value) Iin of the input current IL1 detected by the input current detector 22 (ST40). Then, the controller 25 compares the input current absolute value (instantaneous value) Iin with the current margin Idip. Also, it compares the input voltage Vin with the voltage margin Vdip (ST41). As a result, when the input current absolute value (instantaneous value) Iin is lower than the current margin Idip and the input voltage Vin is lower than the voltage margin Vdip, it is recognized that the instantaneous power outage is not cancelled. Otherwise, it is recognized that the instantaneous power outage is cancelled. When the instantaneous power outage is cancelled (NO in ST41), the controller 25 returns to the process of step ST1. That is, the sequence control is re-carried out from the start.

On the other hand, when the instantaneous power outage continues (YES in ST41), the controller 25 computes the effective value Vouteff of the output voltage Vout detected by the output voltage detector 23 (ST42). In addition, the voltage difference Vdif is computed by subtracting the reference voltage Vref from the output voltage effective value Vouteff (ST43). Also, the controller 25 acquires the current frequency Fnow. That is, if the process is in the initial step, the initial frequency Ftyp is obtained as the current frequency Fnow (ST44).

Then, the controller 25 determines whether the voltage difference Vdif is positive or negative (ST45). If the voltage difference Vdif is positive (YES in ST45), the controller 25 increases the frequency Fnow by a prescribed value α (ST46). Then, the controller 25 determines whether or not the frequency Fnow+α is over the highest frequency Fmax (ST47). If the frequency Fnow+α is not over the highest frequency Fmax (NO in ST47), the frequency Fnow+α is used as it is. On the other hand, when the frequency Fnow+α is over the highest frequency Fmax (YES in ST47), the frequency Fnow+α is replaced by the highest frequency Fmax (ST48).

On the other hand, when the voltage difference Vdif is negative (NO in ST45), the controller 25 decreases the frequency Fnow by a prescribed value β (ST49). Then, the controller 25 determines whether or not the frequency Fnow-β is lower than the lowest frequency Fmin (ST50). If the frequency Fnow-β is not lower than the lowest frequency Fmin (NO in ST50), the frequency Fnow-β is kept as it is. On the other hand, when the frequency Fnow-β is lower than the lowest frequency Fmin (YES in ST50), the frequency Fnow-β is replaced by the lowest frequency Fmin (ST51).

The controller 25 alternately drives the first switch S1 and the second switch S2 on and off at the timing of frequency Fnow (frequency Fnow+α, frequency Fnow-β, Fmax or Fmin). That is, the half bridge inversion process is carried out (ST52: power outage control unit). Then, the controller 25 returns to the process of the step ST39.

Figure 21:
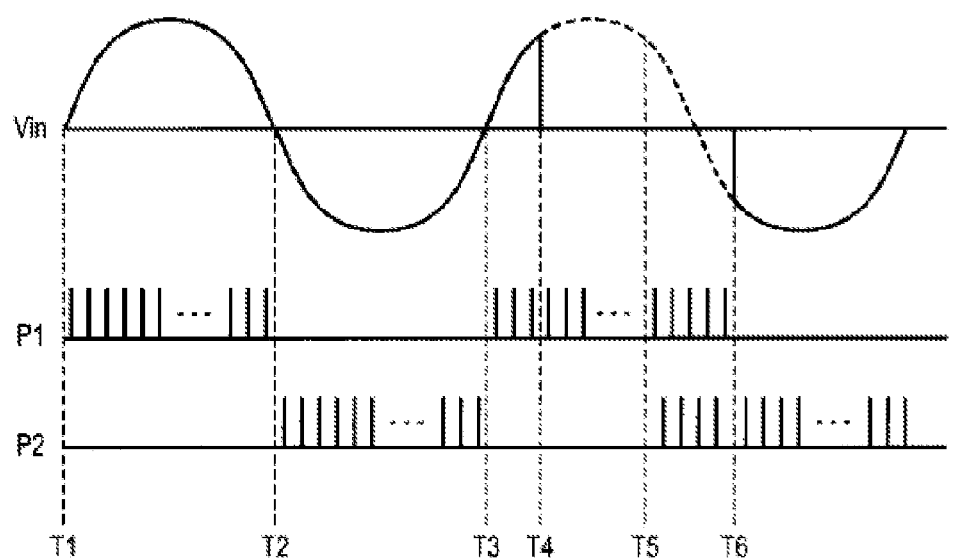
FIG. 21 is a time chart illustrating the signal waveforms of the input voltage Vin and a first and a second pulse signals P1, P2 in case of instantaneous power outage in the second embodiment.

FIG. 21 shows the timing of the first pulse signal P1 and the second pulse signal P2 when the instantaneous power outage takes place. As shown in FIG. 21, at time point T4, the instantaneous power outage takes place, i.e., the power attains a value of 0. When the instantaneous power outage takes place at the time point T4, the first pulse signal P1 and the second pulse signal P2 continue their operating regime as though no change has taken place in the power level, from time period T4 to T5. Then, determination is made that an instantaneous power outage has occurred from the fact that the input voltage remains at zero after the margin time t1. At this point in time, the operation mode becomes the instantaneous power outage mode.

In the instantaneous power outage mode, the first switch S1 and the second switch S2 are alternately turned on/off, that is, the so-called half bridge operation is carried out. In this case, the output control is the so-called frequency modulation. That is, the so-called LC resonance relationship is realized, when the frequency increases, the output current decreases, and when the frequency decreases, the output current increases. Here, the tolerance range of control is defined by the highest frequency Fmax and the lowest frequency Fmin, and the frequency is controlled within that range.

During the period when the instantaneous power outage takes place (T4 to T6), the half bridge operation continues. Then, at time point T6, if the input voltage Vin is recovered, it returns to the normal operation routine.

As explained above, in the second embodiment, when the instantaneous power outage takes place, on the basis of the charging voltage of the smoothing capacitor C3, the first switch S1 and the second switch S2 are alternately turned on/off, and the operation is switched to the half bridge operation. Consequently, even when power outage takes place, if the power supply is instantaneously recovered, the output voltage Vout can be maintained until the power supply is recovered from the power outage state.

Third Embodiment

In the following, the third embodiment corresponding to the standby mode will be explained with reference to the drawings. The hardware configuration of the power conversion apparatus 1 is the same as that of the first embodiment. Consequently, FIG. 1 is adopted, and detailed explanation will not be repeated.

Here, the standby mode is an effective mode when, for example, the load 15 becomes the high impedance state, and the output voltage Vout rises.

The third embodiment differs from the first embodiment in a part of the sequence control executed by the controller 25. The controller 25 executes the sequence control with the steps of operation shown in the flow charts in FIGS. 22 to 24 according to the power conversion program stored in the program memory 26. The same keys as those in the above in FIGS. 14 and 15 for the first embodiment are adopted here to represent the same steps of operation, and only the different steps of operation will be explained.

That is, in the initialization process of steps ST1 to ST2, the controller 25 further sets the load-free current determination margin Iopen at the default value (ST61). Also, the standby mode flag SM is reset at "0" (ST62).

Here, the load-free current determination margin Iopen is the tolerance range for determination that the load 15 has high impedance.

Then, the process of steps ST3 to ST22 is the same as that in the first embodiment. According to the first embodiment, in the process of step ST22, when it is detected that the time counted by the timer reaches the margin Tbal of the current balance determination time, the controller 25 returns to the process of step ST3. In the third embodiment, it goes to the step ST63.

The controller 25 computes the mean value Ioutave of the output current absolute value (instantaneous value) Iout during the period of the margin Tbal of the current balance determination time (ST63). Then, the output voltage mean value Ioutave and the load-free current determination margin Iopen are compared with each other (ST64). As a result, when the output current mean value Ioutave is over the load-free current determination margin Iopen (NO in ST64), it is determined that the load 15 is not of a high impedance. In this case, instead of going to the standby mode, the controller 25 returns to the process of step ST3. That is, the same sequence control as that in the first embodiment continues.

On the other hand, when the output current mean value Ioutave is lower than the load-free current determination margin Iopen (YES in ST64), it is determined that the load 15 is in the high impedance, and it enters the standby mode. That is, the controller 25 sets the standby mode flag SM at "1" (ST65). That is, the controller 25 turns off (opens) both the first switch S1 and the second switch S2 (ST66: standby mode transition unit).

Then, the controller 25 acquires the absolute value (instantaneous value) Iout of the output current IL2 (ST67). Then, at each time of acquisition of these values, the output current mean value Ioutave is computed (ST68), and the output current mean value Ioutave and the load-free current determination margin Ipoen are compared with each other (ST69).

The controller 25 repeatedly carries out the process of the steps ST67 to ST69 until the output current mean value Ioutave becomes over the load-free current determination margin Iopen. If the output current mean value Ioutave is over the load-free current determination margin Iopen, the controller 25 recognizes that high impedance state of the load 15 is avoided. In this case, the controller 25 resets the standby mode flag SM at "0" (ST70), and it exits the standby mode. Then, it returns to the process of step ST1. That is, the sequence control is carried out again from the start.

As explained above, according to the third embodiment, for example, when the load 15 has a high impedance, the load current becomes nearly zero, and the system goes into the standby mode. As a result, the switching operation is stopped for both the first switch S1 and the second switch S2. In this case, the potential Vm at the middle point X1 between the first switch S1 and the second switch S2 is isolated from both the potential of the smoothing capacitor C3 and the ground potential GND. Consequently, the potential Vm is determined according to the parasitic capacitance of the semiconductor element. Here, the lower side of the potential Vm is clamped by the ground potential GND. On the other hand, the upper side is clamped by the potential of the smoothing capacitor C3.

Consequently, the potential Vm at the middle point X1 varies in the range from the ground potential GND to the potential of the smoothing capacitor C3. The source of this variation is the AC power supply 11 connected to the input side. That is, even when the first switch S1 and the second switch S2 do not carry out the switching operation, the potential Vm at the middle point X1, to which the AC power supply 11 is connected so that the frequency is low, varies. Due to this variation, the second LC circuit 14 carries out the operation weakly. The power conversion apparatus 1 uses the electric power in this case to guarantee the minimum necessary function, such as the standby current of the IC, etc.

Figure 25:
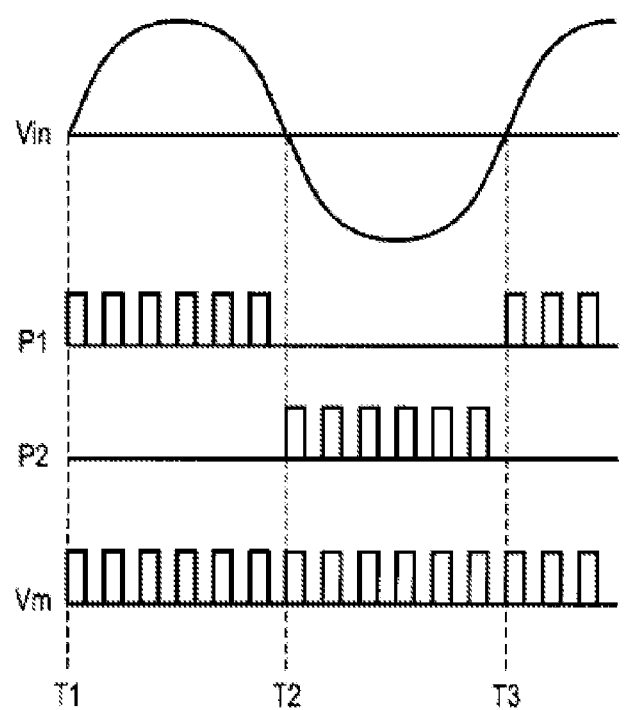
FIG. 25 is a time chart illustrating the waveforms of the input voltage Vin, a first and a second pulse signals P1, P2, and the middle point voltage Vm in a normal mode of operation in the third embodiment.

FIG. 25 is a waveform diagram illustrating the input voltage Vin, the first pulse signal P1 and the second pulse signal P2, and the potential Vm at the middle point X1 during normal operation of the power supply. In the normal operation, as explained above, when the polarity of the input voltage Vin is positive, the first pulse signal P1 is output, and the first switch S1 is switched for operation. When the polarity is negative, the second pulse signal P2 is output, and the second switch S2 is switched for operation. In both cases, the potential Vm at the middle point X1 becomes the rectangular shaped voltage waveform with the amplitude from the ground potential GND to the potential of the smoothing capacitor C3. The second LC circuit 14 is driven by this rectangular shaped voltage.

Figure 26:
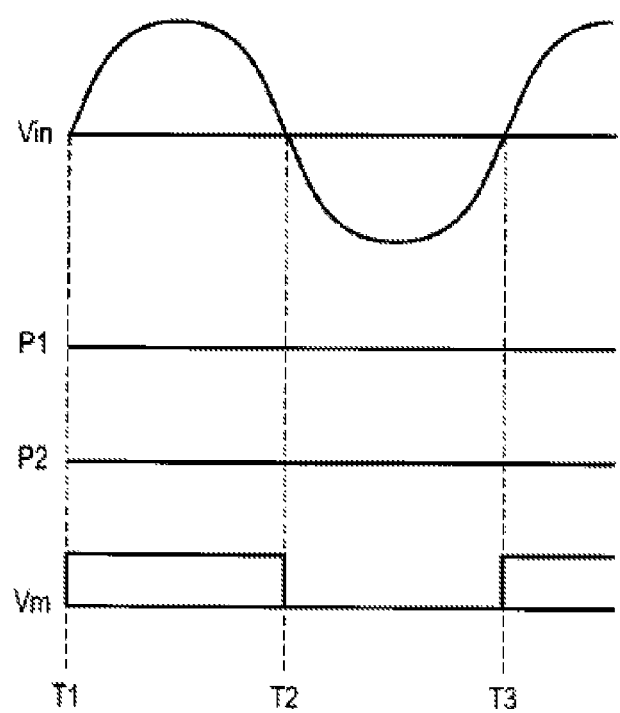
FIG. 26 is a time chart illustrating the waveforms of the input voltage Vin, a first and a second pulse signals P1, P2, and the middle point voltage Vm in the standby mode of operation in the third embodiment.

FIG. 26 is a waveform diagram illustrating the input voltage Vin, the first pulse signal P1, the second pulse signal P2, and the potential Vm at the middle point X1 in the standby mode. In the standby mode, since the first pulse signal P1 and the second pulse signal P2 are not output, the first switch S1 and the second switch S2 do not carry out the switching operation. However, since the AC power supply 11 is connected, at the middle point X1, the voltage Vm varies within the maximum amplitude from the ground potential GND to the potential of the smoothing capacitor C3. Depending on the parasitic capacitance, this voltage Vm may have a rectangular waveform or a sinusoidal waveform. Although the power is weak due to variation in the voltage at the low frequency, it is possible to feed the power to the side of the load 15.

As explained above, in the standby mode, without driving the first switch S1 and the second switch S2, a low-frequency voltage is generated, and it is possible to feed a low voltage to the load. Furthermore, since the first switch S1 and the second switch S2 are not driven, no power loss takes place from switch operation.

Fourth Embodiment

Next, the fourth embodiment also corresponding to the standby mode just as in the third embodiment will be explained with reference to the drawings.

In the third embodiment, explanation has been made on the case when it becomes the standby mode as the load 15 becomes the high impedance state. Now, in the fourth embodiment, it also enters the standby mode when the sleep command instructing transition to the standby mode is input from the outer side.

The fourth embodiment differs from the third embodiment in that a step of determining the presence of the sleep command is added after the step ST22 of the sequence control executed by the controller 25, and that a step of determining the presence of the release command instructing the release of the standby mode is added after the step ST66.

Figure 22:
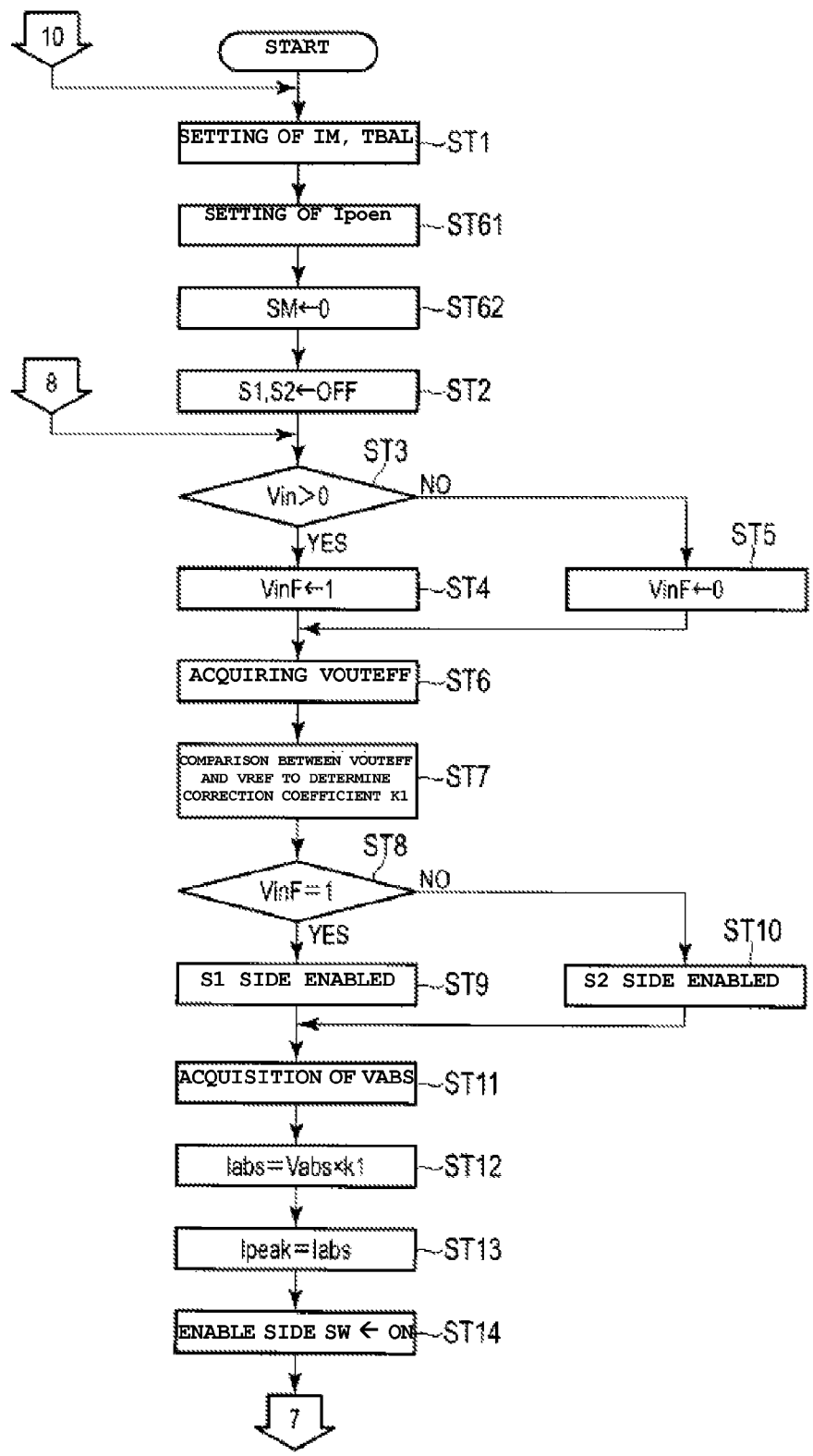
FIG. 22 is a flowchart illustrating the sequence control executed by the controller in the power conversion apparatus in a third embodiment.
Figure 23:
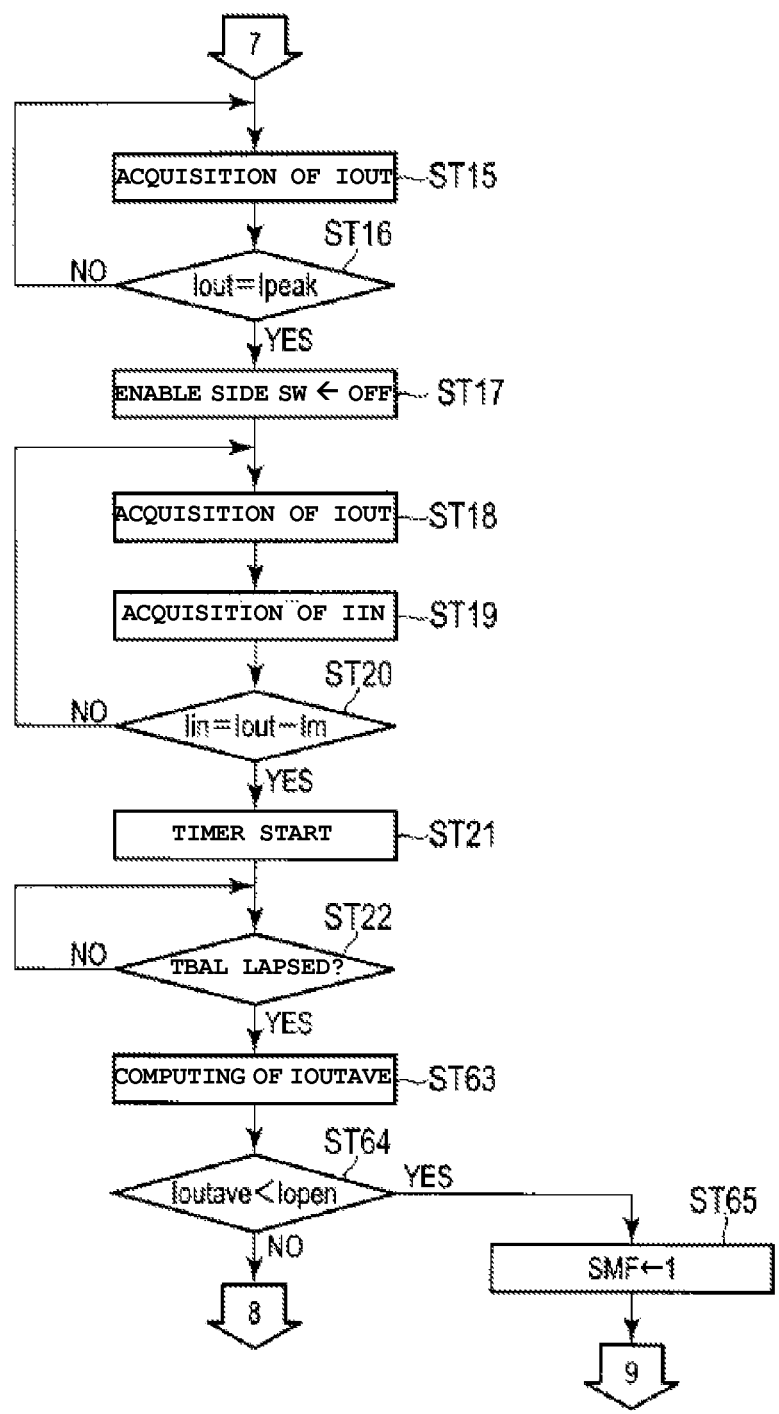
FIG. 23 is a flow chart illustrating the steps of operation of step ST14 and thereafter in the sequence control shown in FIG. 22.
Figure 24:
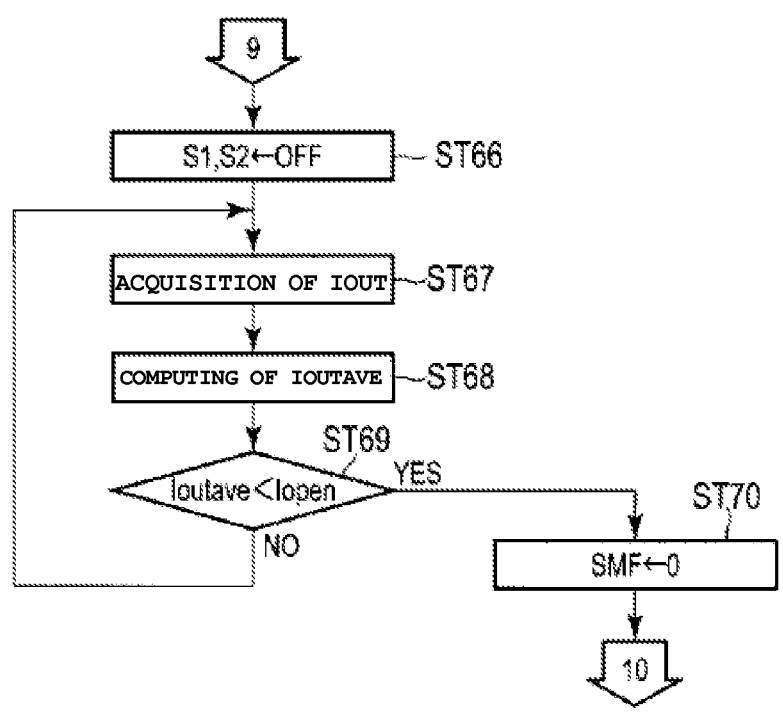
FIG. 24 is a flow chart illustrating the steps of operation of step ST64 and thereafter in the sequence control shown in FIG. 23.
Figure 27:
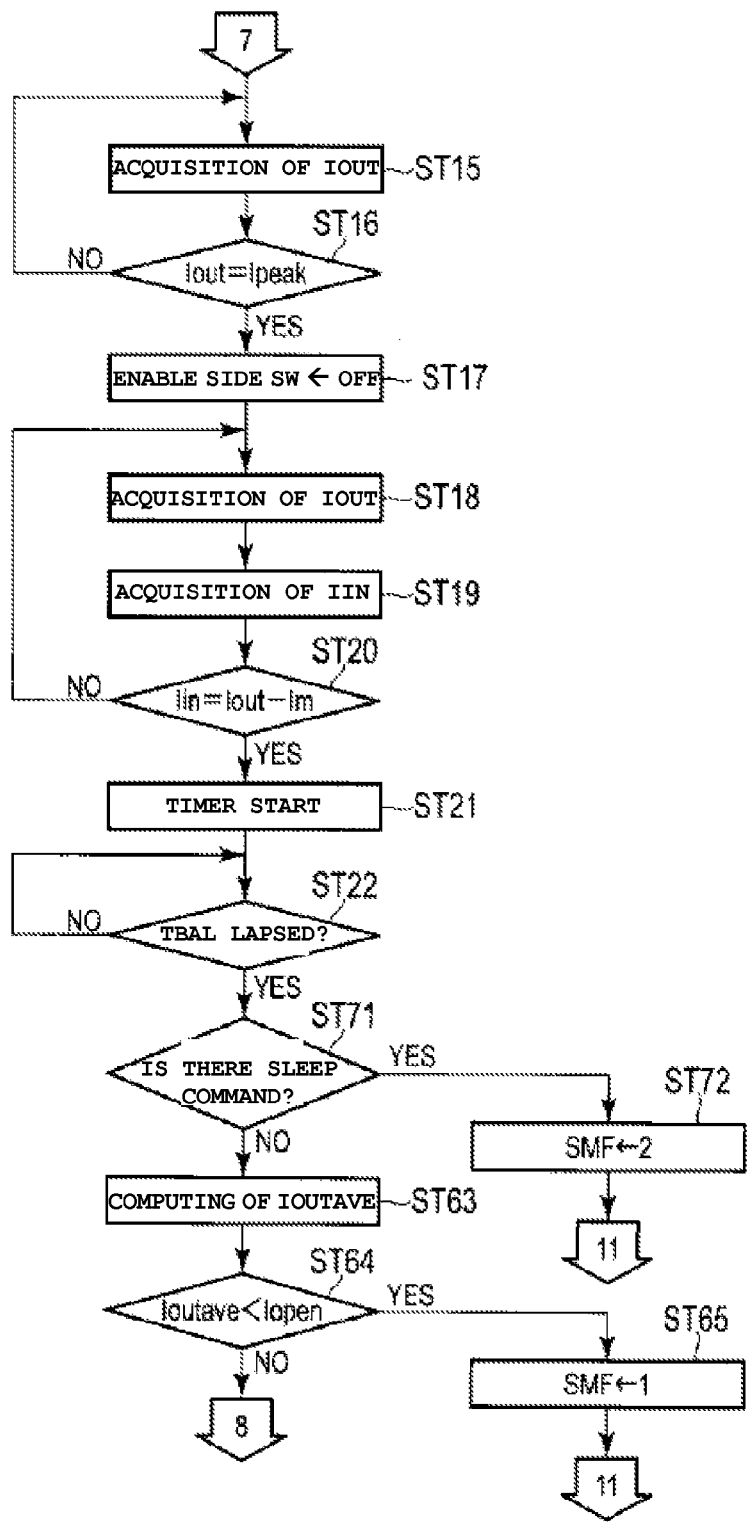
FIG. 27 is a flow chart illustrating the operation of the step ST14 and thereafter of the sequence control executed by the controller in the power conversion apparatus in a fourth embodiment.
Figure 28:
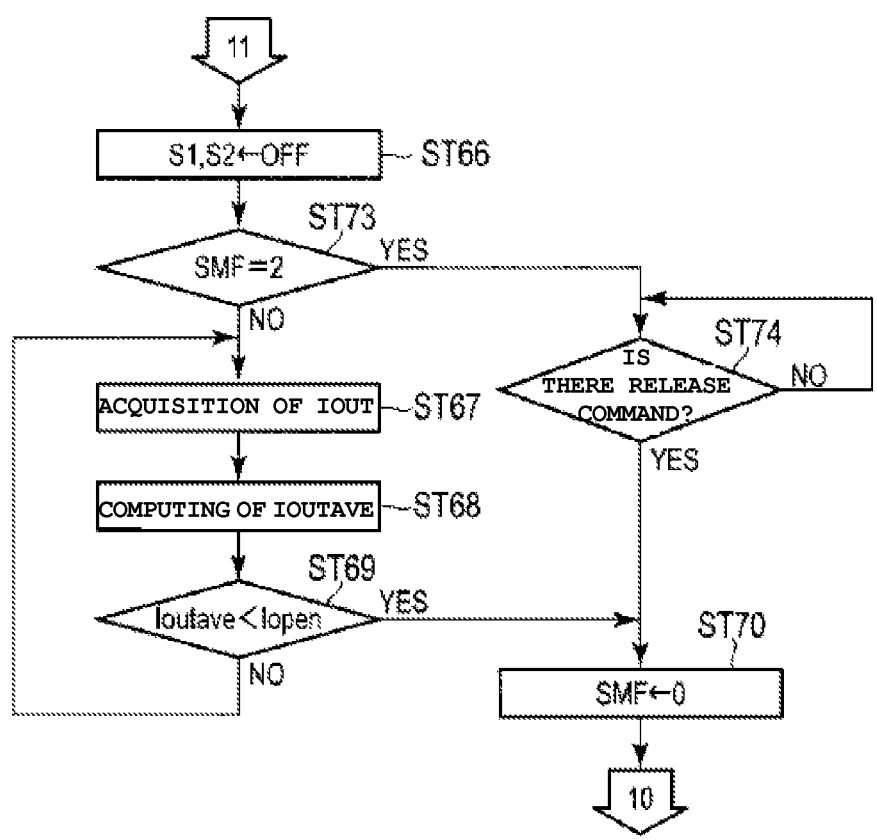
FIG. 28 is a flow chart illustrating the operation of the step ST65 and thereafter in the sequence control shown in FIG. 27.

That is, the controller 25 executes the sequence control with the steps of operation in the flow chart shown in FIGS. 22, 27 and 28 according to the power conversion program stored in the program memory 26. The same reference numbers and letters as those in the above in the sequence control of the third embodiment shown in FIGS. 22 to 24 are adopted to represent the same steps of operation, and only the different steps of operation will be explained.

After the process of steps ST1 to ST22 is completed, the controller 25 determines whether or not the sleep command is received from exterior of the power supply circuit (ST71). When the sleep command is not received, it goes to step ST63, and the output current mean value Ioutave is computed. Then, the output current mean value Ioutave and the load-free current determination margin Iopen are compared with each other (ST64). As a result, if the output current mean value Ioutave is over the load-free current determination margin Iopen (NO in ST64), the power supply does not go into the standby mode. On the other hand, when the output current mean value Ioutave is lower than the load-free current determination margin Iopen (YES in ST64), it goes into the standby mode.

On the other hand, when a sleep command is received from the outer side (YES in ST71), the controller 25 immediately goes to the standby mode. In this case, the controller 25 sets the standby mode flag SM at "2" (ST72). Also, the controller 25 turns off (opens) the first switch S1 and the second switch S2 (ST66).

Then, the controller 25 checks the standby mode flag SM (ST73). If the standby mode flag SMF is "1", the process of steps ST67 to ST70 is carried out just as in the third embodiment.

When the standby mode flag SMF is "2", that is, when it goes to the standby mode under the sleep command, the controller 25 stands by for receiving the release command of the standby mode (ST74). When the release command is received (YES in ST74), the controller 25 resets the standby mode flag SM to "0" (ST70), and it gets out of the standby mode. Then, it returns to the process of step ST1. That is, the sequence control is carried out again from the start.

In this way, in the fourth embodiment, in addition to the case when the load 15 has a high impedance state, when a sleep command instructing transition to the standby mode is input from the outer side, the power supply can also make transition to the standby mode. Then, just as in the third embodiment, in the standby mode, the first switch S1 and the second switch S2 are not driven, and a low-frequency voltage is generated so that a weak voltage can be fed to the load. Here, since the first switch S1 and the second switch S2 are not driven, no power loss takes place associated with driving (opening and closing) of the switches.

Although specific embodiments and configurations of the components and operation of the power supply have been described, alternatives operations and components may be used herein. For example, in the embodiments explained above, the switch S1 and the switch S2 are mechanical switches. However, the switches S1, S2 are not limited to the mechanical switches. The switches S1, S2 may also be replaced by MOS-type field effect transistors (FET) or other elements that function as a switch in a forward direction and as a diode in a backward direction. Since the MOS-type field effect transistors have body diodes, the diodes D1, D2 may be omitted. Also, for example, the switches S1, S2 may also be replaced by semiconductor switches without body diodes that can be controlled for two-way on/off of current, such as triac (triode for alternating current) or the like. In this case, diodes D1, D2 are needed.

In the embodiments, the load 15 is connected in series to the second LC circuit 14. However, the connecting site of the load 105 is not limited to this site. For example, a second load may be connected in parallel with the smoothing capacitor C3. In this case, for the load 15 connected in series to the second LC circuit 14, high frequency AC driving is carried out, while DC driving can be carried out for the second load.

In the aforementioned embodiment, the output current mean value Ioutave and the load-free current determination margin Iopen are compared with each other, and, when the output current mean value Ioutave is smaller than the load-free current determination margin Iopen, it enters the standby mode. However, since the load 15 becomes a high impedance, the output voltage Vout rises, it may be determined whether or not the mode becomes the standby mode from the magnitude of the output voltage Vout detected by the output voltage detector 23.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of converting AC power to a DC output, comprising:
   providing a first LC circuit including a first current detector, a power supply, a first capacitor, a first inductor, and a first switch group including a first switch and a first diode that are connected in parallel, wherein the first switch group is connected in series with the first current detector, the power supply, the first capacitor, and the first inductor;
   providing a second LC circuit including a second current detector, a load, a second capacitor, and a second inductor; wherein the second LC circuit is connected to the first switch group in parallel;
   providing a second switch group including a second switch and a second diode that are connected in parallel, wherein the second switch group is connected to the first switch group in series through an intermediate node, and a smoothing capacitor and the second switch group are connected in series between ground and the intermediate node; and
   selectively opening and closing the first and second switches, in response to at least an input polarity of the power supply to provide a DC current to the load.

2. The method of claim 1, further including the steps of:
   providing a controller;
   providing an input voltage and input current detector; and opening and closing the first and second switches with the controller based upon the detected values of input voltage and input current.

3. The method of claim 2, further including the steps of:
providing a load voltage and load current detector; and
opening and closing the first and second switches with the controller based upon the detected values of load voltage and load current.

4. The method of claim 3, wherein at least one of the first and second switches is closed and opened at a frequency greater than a power supply input frequency.

5. The method of claim 1, further including the steps of detecting an interruption in power supplied by the power supply; and
alternately opening and closing the first switch and the second switch when the interruption in power is detected.

6. The method of claim 1, further including the steps of:
detecting an impedance of the load; and
if the impedance exceeds a threshold value, maintaining both the first switch and the second switch in an open position.

7. The method of claim 1, further including the step of maintaining the first switch and the second switch in an open position in response to a sleep command.

* * * * *